(12) United States Patent
Boroson et al.

(10) Patent No.: US 10,128,949 B2
(45) Date of Patent: Nov. 13, 2018

(54) METHODS, SYSTEMS, AND APPARATUS FOR GLOBAL MULTIPLE-ACCESS OPTICAL COMMUNICATIONS

(71) Applicant: Massachusetts Institute of Technology, Cambridge, MA (US)

(72) Inventors: Don M. Boroson, Needham, MA (US); Bryan S. Robinson, Arlington, MA (US); Robert J. Menrad, Greenbelt, MD (US); John Rush, Greenbelt, MD (US); Kenneth Perko, Greenbelt, MD (US)

(73) Assignee: Massachusetts Institute of Technology, Cambridge, MA (US)

( * ) Notice: Subject to any disclaimer, the term of this patent is extended or adjusted under 35 U.S.C. 154(b) by 47 days.

(21) Appl. No.: 15/054,546

(22) Filed: Feb. 26, 2016

(65) Prior Publication Data
US 2017/0302377 A1 Oct. 19, 2017

Related U.S. Application Data

(60) Provisional application No. 62/121,668, filed on Feb. 27, 2015.

(51) Int. Cl.
*H04B 10/00* (2013.01)
*H04B 10/118* (2013.01)
(Continued)

(52) U.S. Cl.
CPC ............. *H04B 10/118* (2013.01); *H04B 7/19* (2013.01); *H04B 7/195* (2013.01);
(Continued)

(58) Field of Classification Search
CPC ............. H04B 10/118; H04B 10/1129; H04B 7/18513; H04B 7/19; H04B 7/18521; H04J 14/02
(Continued)

(56) References Cited

U.S. PATENT DOCUMENTS

| 5,367,371 A | 11/1994 | Krawczyk |
| 5,450,223 A | 9/1995 | Wagner et al. |

(Continued)

FOREIGN PATENT DOCUMENTS

| CA | 2794400 A1 | 10/2011 |
| EP | 2073404 A1 | 6/2009 |
| WO | WO 2011/120654 A1 | 10/2011 |

OTHER PUBLICATIONS

International Search Report and Written Opinion dated Feb. 24, 2016 from International Application No. PCT/US2015/043638.
(Continued)

*Primary Examiner* — Don N Vo
(74) *Attorney, Agent, or Firm* — Smith Baluch LLP

(57) ABSTRACT

A wide-field telescope and focal plane array (FPA) that look at Earth and satellites in low- and medium-Earth orbit (LEO and MEO) from a satellite in higher orbit, such as geostationary Earth orbit (GEO), can serve as a node in an on-demand, optical multiple access (OMA) communications network. The FPA receives asynchronous low-rate signals from LEO and MEO satellites and ground stations at a signal rate determined in part by the FPA frame rate (e.g., kHz to MHz). A controller tracks the low-rate signals across the FPA as the signal sources orbit Earth. The node also includes one or more transmitters that relay the received information to other nodes via wavelength-division multiplexed (WDM) free-space optical signals. These other signals may include low-rate telemetry communications, burst transmissions, and continuous data relay links.

26 Claims, 9 Drawing Sheets

(51) Int. Cl.
*H04B 10/60* (2013.01)
*H04B 10/516* (2013.01)
*H04J 14/02* (2006.01)
*H04B 7/19* (2006.01)
*H04B 7/195* (2006.01)

(52) U.S. Cl.
CPC ......... *H04B 10/5161* (2013.01); *H04B 10/60* (2013.01); *H04J 14/0223* (2013.01)

(58) Field of Classification Search
USPC .................................................. 398/125
See application file for complete search history.

(56) References Cited

U.S. PATENT DOCUMENTS

| | | | |
|---|---|---|---|
| 5,508,932 | A | 4/1996 | Achkar et al. |
| 5,710,652 | A | 1/1998 | Bloom et al. |
| 5,903,545 | A | 5/1999 | Sabourin et al. |
| 6,098,929 | A | 8/2000 | Falbel |
| 6,087,646 | A | 11/2000 | Didinsky |
| 6,147,644 | A | 11/2000 | Castles et al. |
| 6,268,944 | B1 | 7/2001 | Szapiel |
| 6,297,897 | B1 | 10/2001 | Czichy et al. |
| 6,411,414 | B1 | 6/2002 | Abate et al. |
| 6,445,496 | B1 | 9/2002 | Presby et al. |
| 6,535,734 | B1 | 3/2003 | Miller et al. |
| 6,570,695 | B1 | 5/2003 | Pribil et al. |
| 6,661,975 | B1 | 12/2003 | Hall et al. |
| 6,674,576 | B1 | 1/2004 | Carollo et al. |
| 6,763,195 | B1 | 7/2004 | Willebrand et al. |
| 6,778,779 | B1 | 8/2004 | Shay et al. |
| 6,834,164 | B1 | 12/2004 | Chan |
| 6,868,237 | B2 | 3/2005 | Willebrand et al. |
| 7,197,248 | B1 | 3/2007 | Vorontsov et al. |
| 7,277,641 | B1 * | 10/2007 | Gleckman .......... H04B 10/118 398/128 |
| 7,289,736 | B1 | 10/2007 | Graves |
| 7,292,789 | B1 | 11/2007 | Capots et al. |
| 7,373,673 | B1 | 5/2008 | Krill et al. |
| 7,343,099 | B2 | 11/2008 | Wirth et al. |
| 7,457,326 | B2 | 11/2008 | Rogers et al. |
| 7,609,972 | B2 | 10/2009 | Cunningham et al. |
| 7,631,839 | B1 | 12/2009 | Duncan et al. |
| 7,826,752 | B1 | 11/2010 | Zanoni et al. |
| 7,920,794 | B1 | 4/2011 | Whaley et al. |
| 7,925,167 | B1 | 4/2011 | Kozubal et al. |
| 8,526,328 | B2 | 9/2013 | Hunt et al. |
| 8,989,579 | B2 | 3/2015 | Arnold et al. |
| 9,048,950 | B2 | 6/2015 | Chen et al. |
| 9,304,259 | B1 | 4/2016 | Yasumura |
| 9,723,386 | B1 * | 8/2017 | Ni ...................... H04Q 11/0005 |
| 9,813,151 | B2 | 11/2017 | Kingsbury et al. |
| 9,866,324 | B2 | 1/2018 | Clemmensen |
| 2002/0041575 | A1 | 4/2002 | Karabinis et al. |
| 2002/0121574 | A1 | 9/2002 | Davis |
| 2002/0167702 | A1 | 11/2002 | Badesha et al. |
| 2002/0167708 | A1 | 11/2002 | Tsao et al. |
| 2003/0050008 | A1 | 3/2003 | Patterson et al. |
| 2003/0091276 | A1 | 5/2003 | Wang et al. |
| 2003/0095302 | A1 | 5/2003 | Schuster et al. |
| 2003/0172208 | A1 | 9/2003 | Fidler |
| 2004/0148083 | A1 | 1/2004 | Arakawa et al. |
| 2004/0052465 | A1 | 3/2004 | Verbana et al. |
| 2004/0127158 | A1 | 7/2004 | Dai et al. |
| 2004/0172403 | A1 | 9/2004 | Steele et al. |
| 2004/0249964 | A1 | 12/2004 | Mougel et al. |
| 2005/0100339 | A1 | 5/2005 | Tegge |
| 2006/0024061 | A1 | 2/2006 | Wirth et al. |
| 2006/0030258 | A1 | 2/2006 | Mocquard et al. |
| 2007/0019605 | A1 | 1/2007 | Rioux et al. |
| 2007/0031150 | A1 | 2/2007 | Fisher et al. |
| 2007/0031151 | A1 | 2/2007 | Cunningham et al. |
| 2008/0002981 | A1 * | 1/2008 | Valley ................ H04B 7/18521 398/121 |
| 2008/0123738 | A1 | 5/2008 | Katsavounidis et al. |
| 2008/0181108 | A1 | 7/2008 | Hashmi et al. |
| 2009/0034654 | A1 | 2/2009 | Inukai et al. |
| 2009/0131046 | A1 | 5/2009 | Karabinis et al. |
| 2010/0021166 | A1 | 1/2010 | Way |
| 2010/0090866 | A1 | 4/2010 | Chen et al. |
| 2010/0201566 | A1 | 8/2010 | Wyler |
| 2010/0226495 | A1 | 9/2010 | Kelley et al. |
| 2011/0004405 | A1 | 1/2011 | Hutchin |
| 2011/0169688 | A1 | 7/2011 | Wyler |
| 2011/0239421 | A1 | 10/2011 | Tertitsk |
| 2011/0274429 | A1 | 10/2011 | Caplan et al. |
| 2012/0008961 | A1 | 1/2012 | Chen et al. |
| 2012/0109425 | A1 | 5/2012 | Janson et al. |
| 2012/0199697 | A1 | 8/2012 | Nagabhushan et al. |
| 2012/0276898 | A1 | 11/2012 | Korb et al. |
| 2012/0292531 | A1 | 11/2012 | Grudinin et al. |
| 2013/0156439 | A1 | 6/2013 | Arnold et al. |
| 2013/0182620 | A1 | 7/2013 | Chaffee et al. |
| 2013/0183040 | A1 | 7/2013 | Elahmadi |
| 2013/0193303 | A1 | 8/2013 | Smith et al. |
| 2013/0208082 | A1 | 8/2013 | Williams et al. |
| 2013/0293414 | A1 | 11/2013 | Robinson et al. |
| 2013/0336661 | A1 | 12/2013 | Chorvalli |
| 2014/0004853 | A1 | 1/2014 | Mitchell |
| 2014/0016932 | A1 | 1/2014 | Coleman et al. |
| 2014/0016941 | A1 | 1/2014 | Coleman et al. |
| 2014/0222472 | A1 | 8/2014 | Platzer |
| 2014/0241731 | A1 | 8/2014 | Peach et al. |
| 2014/0266420 | A1 | 9/2014 | Brown |
| 2014/0270749 | A1 | 9/2014 | Miniscalco et al. |
| 2014/0294399 | A1 | 10/2014 | Markowski et al. |
| 2014/0341586 | A1 | 11/2014 | Wyler |
| 2014/0354477 | A1 | 12/2014 | Robinson |
| 2014/0354996 | A1 | 12/2014 | Fontecchio et al. |
| 2014/0362875 | A1 | 12/2014 | Le Kemec et al. |
| 2014/0376001 | A1 | 12/2014 | Swanson |
| 2015/0078250 | A1 | 3/2015 | Mineta et al. |
| 2015/0110491 | A1 | 4/2015 | Gayrard et al. |
| 2015/0125157 | A1 | 5/2015 | Chao et al. |
| 2015/0131703 | A1 | 5/2015 | Baiter et al. |
| 2015/0207562 | A1 | 7/2015 | Brumley et al. |
| 2015/0215041 | A1 | 7/2015 | Pechner et al. |
| 2015/0298827 | A1 | 10/2015 | Nguyen et al. |
| 2016/0013882 | A1 | 1/2016 | Hashimoto |
| 2016/0033649 | A1 | 2/2016 | Mathews et al. |
| 2016/0043800 | A1 | 2/2016 | Kingsbury et al. |
| 2016/0087711 | A1 | 3/2016 | Tayrac et al. |
| 2016/0112124 | A1 | 4/2016 | Juarez et al. |
| 2016/0192303 | A1 | 6/2016 | Tender et al. |
| 2016/0204851 | A1 | 7/2016 | Li et al. |
| 2016/0204899 | A1 | 7/2016 | Kojima et al. |
| 2016/0308601 | A1 | 10/2016 | Mochida |
| 2017/0264365 | A1 | 9/2017 | Takahashi et al. |

OTHER PUBLICATIONS

International Search Report and Written Opinion dated Jul. 26, 2016 from International Application No. PCT/US16/12644.
International Search Report and Written Opinion dated Jul. 26, 2016 from International Application No. PCT/US16/12643.
International Search Report and Written Opinion dated Jun. 29, 2015 from International Application No. PCT/US2015/019890.
Kramer, "EDRS (European Data Relay Satellite) Constellation," EO Sharing Earth Observation Resources, Oct. 21, 2013, pp. 1-9.
Notice of Allowance dated Dec. 30, 2016 from U.S. Appl. No. 14/644,425.
Office Action dated Apr. 22, 2016 from U.S. Appl. No. 14/644,425.
Office Action dated Sep. 8, 2016 from U.S. Appl. No. 14/817,985.
International Search Report and Written Opinion from International Application No. PCT/US2016/019732, 13 pages, dated Nov. 29, 2016.
U.S. Office Action dated Feb. 8, 2017, in regards to U.S. Appl. No. 14/991,386, 57 pages.
U.S. Office Action dated Apr. 7, 2017, in regards to U.S. Appl. No. 14/991,394, 63 pages.

(56) References Cited

OTHER PUBLICATIONS

U.S. Office Action dated Feb. 22, 2017, in regards to U.S. Appl. No. 14/991,377, 58 pages.
U.S. Notice of Allowance dated Apr. 10, 2017, in regards to U.S. Appl. No. 14/644,425, 10 pages.
U.S. Notice of Allowance dated Apr. 12, 2017, in regards to U.S. Appl. No. 14/817,985, 11 pages.
U.S. Appl. No. 14/991,394, filed Jan. 8, 2016, Boroson et al.
U.S. Appl. No. 14/991,377, filed Jan. 8, 2016, Boroson et al.
U.S. Appl. No. 14/991,386, filed Jan. 8, 2016, Boroson et al.
"Cubesat Design Specification", Rev. 13, The CubeSat Program, Cal Poly SLO, pp. 1-42, Feb. 20, 2014.
Aerocube-OCSD A, B (IOCPS A, B), accessed at: http://space.skyrocket.de/doc_sdat/aerocube-ocsd.htm, 2 pages, Dec. 5, 2014.
Aherne, M. R. et al., "Aeneas-Colony I Meets Three-Axis Pointing", 25th Annual AIAA/USU Conference on Small Satellites, pp. 1-11, Aug. 8-11, 2011.
Alluru, S. R. et al., "An Optical Payload for Cubesats," 24$^{th}$ Annual AIAA/USU Conference on Small Satellites, pp. 1-13, Aug. 9, 2010.
Alluru, Seshupriya Reddy, "A System Design of an Optical Wireless Communication System for Cubesats," University of Florida Master's Thesis, 78 pages, Dec. 2010.
Andrews, L. C. et al. "Laser Beam Propagation through Random Media", Second Edition (SPIE Press Monograph vol. PM152). SPIE—The International Society for Optical Engineering, ISBN-13: 978-0819459480, 2005.
Bingham, B. et al., "The Road to a Three-Axis-Stabilized CubeSat," 32nd Annual AAS Rocky Mountain Guidance and Control Conference, vol. 133, pp. 607-613 Jan. 30 thru Feb. 4, 2009.
Biswas, A. et al., "The Atmospheric Channel", Deep Space Communications, Chapter 3, pp. 121-213, 2006.
Buchen, E. et al., "2014 Nano/Microsatellite Market Assessment," Spaceworks Enterprises, Inc., (SEI), Atlanta, GA, pp. 1-18, 2014.
Caplan, D. O. et al., "Parallel Direct Modulation Laser Transmitters for High-speed High-sensitivity Laser Communications," CLEO: Applications and Technology, PDPB12, Optical Society of America, 2 pages, 2011.
Caplan, D. O., "A technique for measuring and optimizing modulator extinction ratio," IEEE, Conference on Lasers and Electro-Optics, 2000 (CLE0 2000), pp. 335-336, May 7-12, 2000.
Caplan, D. O., et al., "Demonstration of 2.5-Gslot/s optically-preamplified M-PPM with 4 photons/bit receiver sensitivity," Optical Fiber Conference (OFC), Paper PDP32, 3 pages, 2005.
Caplan, D.O., et al., "Laser communication transmitter and receiver design," J. Opt. Fiber Commun. Rep. 4, pp. 225-362, 2007.
Caplan, D.O., et al., "Power-efficient Noise-insensitive Optical Modulation for High-sensitivity Laser Communications," CLEO, 2 pages, Jun. 8-13, 2014.
Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" Photonics Tech. Letters, vol. 18, pp. 1560-1562, Jul. 2006.
Coffee, B. et al., "Propagation of CubeSats in LEO using NORAD Two Line Element Sets: Accuracy and Update Frequency", AIAA Guidance, Navigation, and Control Conference, pp. 1-15, Aug. 19-22, 2013.
Contestabile, G. et al., "40 Gb/s WDM NRZ-DPSK All-Optical Clock Recovery and Data Demodulation based on a Periodic Bragg Filter," Optical Fiber Communication/National Fiber Optic Engineers Conference, 3 pages, Feb. 24-28, 2008.
Crassidis, J. L. et al., "A Survey of Nonlinear Attitude Estimation Methods", pp. 1-48, 2007.
Darrell, L., "The Internet—Brought to You by Drones and Balloons," Jun. 27, 2014, 2 pages, downloaded from http://www.bidnessetc.com/business/the-internet-brought-to-you-by-drones-and-balloons/ on Jan. 13, 2016.
Dillow, Clay, "Record-Breaking New Fiber Optic Cables Transmit 100 Terabits per Second," Popular Science, pp. 1-3, Apr. 29, 2011.

Edwards, B. L., et al., "Overview of the Laser Communications Relay Demonstration Project," Space Ops Conference, pp. 1-11, Jun. 11-15, 2012.
Epple, Bernhard, et al., "Discussion on Design Aspects for Free-Space Optical Communication Terminals," IEEE Communications Magazine, vol. 45, Issue 10, pp. 62-69. Oct. 8, 2007.
Excelitas Technologies GmbH & Co. KG, "Thermopile Detector—TPD 1T 0214 G9/3850," Sensor Solutions—Product Specification, Revision—Jan. 24, 2013, 4 pages.
Fields, R. et al., "5.625 Gbps Bidirectional Laser Communications Measurements Between the NFIRE Satellite and an Optical Ground Station", International Conference on Space Optical Systems and Applications, May 11-13, 2011, pp. 44-53.
Gangestad, J. W. et al., "Operations, orbit determination, and Formation Control of the Aerocube-4 Cubesats," (SSC13-X-4), Proc. of 27th AIAA/USU Conference on Small Satellites, pp. 1-8, Aug. 10, 2013.
Hanson, J., et al. "The EDSN Intersatellite Communications Architecture," Proc. of 28th AIAA/USU Conference on Small Satellites, p. 111, Aug. 4-7, 2014.
Hashmall, J.A., et al., "An Algorithm for Converting Static Earth Sensor Measurements Into Earth Observation Vectors", NASA Technical Memorandum from the proceedings of the Flight Mechanics Symposium, pp. 1-13, Oct. 2003.
Hemmati, H., "Laser-Communications with Lunar CubeSat," Jet Propulsion Laboratory, California Institute of Technology, pp. 1-11, Apr. 11, 2013.
Hemmati, H., et al., Near-Earth Laser Communications (book), Print ISBN: 978-0-8247-5381-8, CRC Press Mar. 3, 2009.
Henniger, H. and Wilfert, O., "An Introduction to Free-space Optical Communications", Radioengineering Journal, vol. 19, No. 2, Jun. 2010, pp. 203-212.
Henniger, H. et al., "Free-space optical transmission improves land-mobile communications," SPIE Newsroom, Jan. 9, 2007, pp. 1-3.
Horwath, J., et al., "Broadband Backhaul Communication for Stratospheric Platforms: The Stratospheric Optical Payload Experiment (STROPEX)," Proc. SPIE 6304, Free-Space Laser Communications VI, 63041 N, Sep. 1, 2006, 12 pages.
http://intelsat.com, downloaded Jan. 13, 2016, 1 pages.
http://www.digitalglobe.com, downloaded Jan. 13, 2016, 3 pages.
https://www.planet.com, downloaded Jan. 7, 2013, 6 pages.
https://www.viasat.com, downloaded Jan. 13, 2016, 3 pages.
Janson, S. et al., "Attitude Control on the Pico Satellite Colar Cell Testbed-2", Presentation of Proceedings of the 26$^{th}$ Annual AIAA/USU Conference on Small Satellites, pp. 1-13, Aug. 13, 2012.
Janson, S. et al., "The NASA Optical Communication and Sensor Demonstration Program: An Update." (SSC14-VI-1), Proc. of 28th Annual AIAA/USU Conference on Small Satellites, MIT: Nanosatellite Optical Downlink Experiment (NODE), The Aerospace Corporation 2014, pp. 1-10, Aug. 5, 2014.
Janson, S. et al., "The NASA Optical Communication and Sensor Demonstration Program" (SSC13-II-1), The Aerospace Corporation, pp. 1-19, Aug. 12, 2013.
Kingsbury, R.W. et al., "Design of a Free-Space Optical Communication Module for Small Satellites," (SSC14-IX-6), 28th AIAA/USU Small Satellite Conference, pp. 1-10, Apr. 12, 2014.
Kingsbury, R.W., et al., "Fast-Steering Solutions for CubeSat-Scale Optical Communication," Proc. of International Conference on Space Optics, pp. 1-6, Oct. 7-10, 2014.
Kingsbury, R.W., et al., "Two-Stage Control for CubeSat Optical Communications," CalPoly CubeSat Developers Workshop, pp. 1-29, Apr. 24, 2014.
Klofas, B. et al., "A Survey of CubeSat Communication Systems: 2009-2012", Proceedings of 2013 CalPoly CubeSat Developers' Workshop, pp. 1-41, Apr. 2013.
Kneller, E.W. et al., "Cadet: A High Data Rate Software Defined Radio for SmallSat Applications", (SSC12-X-4), 26th Annual AIAA/USU Conference on Small Satellites, pp. 1-10, 2012.
Kubo-oka, Toshihiro, et al., "Optical Communication Experiment Using Very Small TrAnsponder Component on a Small RISESAT", Proc. International Conference on Space Optical Systems and Applications (ICOS), Oct. 9-12, 2012, 6 pages.

(56) References Cited

OTHER PUBLICATIONS

LADEE, NASA's LADEE Mission, taken from http://www.nasa.gov/mission_pages/ladee/main/index.html, 2 pages, Dec. 5, 2014.
Lambert, S. et al, "Laser Communications in Space", Optical Engineering, vol. 35, No. 5, pp. 1513-1515, May 1996.
Lee, C-H et al., "Transmission of Directly Modulated 2.5-Gb/s Signals Over 250-km of Nondispersion-Shifted Fiber by Using a Spectral Filtering Method," IEEE Photonics Technology Letters, IEEE vol. 8, No. 12, pp. 1725-1727, Dec. 1996.
Li, J. et al., "Design of Attitude Control Systems for CubeSat-Class Nanosatellite", Research Article Journal of Control Science and Engineering, vol. 13, pp. 1-9, Apr. 24, 2013.
Liebe C.C. et al., "Accuracy Performance of Star Trackers—A Tutorial" IEEE Transactions on Aerospace and Electronic Systems, vol. 38 No. 2, pp. 587-599, Apr. 2002.
Mahgerefteh, D. et al., "Penalty-free propagation over 600 km of nondispersion-shifted fiber at 2.5 Gb/s using a directly laser modulated transmitter", CLEO, 1 pages, 1999.
Maryland Aerospace Inc., MAI-400 Reference Manual, 2 pages, Apr. 29, 2014.
Merrelli, Aronne, "The Atmospheric Information Content of Earth's Far Infrared Spectrum", A Dissertation approved for the degree of Doctor of Philosophy (Atmospheric and Oceanic Sciences), 135 pages, Nov. 26, 2012.
Miniscalco, W.J., et al., "Optical Space-Time Division Multiple Access," Journal of Lightwave Technology, vol. 30, No. 11, pp. 1771-1785, Jun. 1, 2012.
Moores, John D. et al., "Architecture Overview and Data Summary of a 5.4 km Free-Space Laser Communications Experiment", Proc. of SPIE, vol. 7464, Aug. 2009, 9 pages.
National Aeronautics and Space Administration, "Laser Communications Relay Demonstration, The Next Step in Optical Communications", 2 pages, Jun. 26, 2013.
Nguyen, T. et al., "Development of a pointing, acquisition, and tracking system for a CubeSat optical communication module," in SPIE OPTO, vol. 9354, pp. 93540O-1 to 93540O-9, Mar. 26, 2015.
Oaida, B.V. et al. "Optical link design and validation testing of the Optical Payload for Lasercomm Science (OPALS) system", Free-Space Laser Communication Technologies XXVI, Proc. of SPIE, vol. 8971, pp. 89710U-1 to 89710U-15, Mar. 6, 2014.
Oaida, B.V. et al., OPALS: An Optical Communications Technology Demonstration from the International Space Station, Aerospace Conference, IEEE, pp. 1-20, 2013, Mar. 2-9, 2013.
Perry, T.S., "Start-up Profile: Skybox Imaging", May 1, 2013, 9 pages, downloaded from http://spectrum.ieee.org/at-work/innovation/startup-profile-skybox-imaging on Jan. 13, 2016.
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 1 of 2).
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 2 of 2).
Pong, C. et al., "A Dual-Spinning, Three-Axis-Stabilized CubeSat for Earth Observations," AIAA Guidance, Navigation, and Control (GNC) Conference, pp. 1-24, 2013.
Pong, C. et al., High-Precision Pointing and Attitude Determination and Control on ExoplanetSat, AIAA Guidance, Navigation, and Control Conference, pp. 1-24, Aug. 13-16, 2012.
Pong, C. et al., "High-Precision Pointing and Attitude Estimation and Control Algorithms for Hardware-Constrained Spacecraft", PhD Thesis, Massachusetts Institute of Technology, pp. 1-254, May 22, 2014.
Robinson, B.S. et al., "The Lunar Laser Communications Demonstration", International Conference on Space Optical Systems and Applications (ICSOS), pp. 54-57, IEEE, May 11-13, 2011.
Santanu, D. et al., "Requirements and Challenges for Tactical Free-Space Lasercomm", Military Communications Conference, IEEE MILCOM, Nov. 16-19, 2008, pp. 1-5.

Sarda, K. et al., "Canadian Advanced Nanospace Experiment 2 Orbit Operations: Two Years of Pushing The Nanosatellite Performance Envelope", ESA Small Satellites, Services and Systems Symposium, 20 pages, 2010.
Schwarzenberg-Czerny, A, "The BRITE Nano-Satellite Constellation Mission," Proc. of 38th COSPAR Scientific Assembly, pp. 1-17, Jul. 15-18, 2010.
Sebacher, K.S. et al., "Laser Crosslink Configurations for RF Satellite Communications Systems", Military Communications Conference, MILCOM 1985, IEEE, vol. 1, pp. 98-103.
Shirasaki, M. et al., "Fibre Transmission Properties of Optical Pulses Produced Through Direct Phase Modulation of DFB Laser Diode," Electron. Letters, vol. 24, pp. 486-488, Apr. 14, 1988.
Sniegowski, J.J. et al., "Development, test and evaluation of MEMS micro-mirrors for free-space optical communications," Free-Space Laser Communications IV, Proceedings of SPIE, vol. 5550, pp. 299-312, Dec. 3, 2014.
Staehle, R.L. et al., "Interplanetary CubeSats: Opening the Solar System to a Broad Community at Lower Cost", Journal of Small Satellites, pp. 1-10, Dec. 8, 2012.
Stotts, L. B. et al., "Hybrid Optical RF Airborne Communications," Proc. of IEEE, vol. 97, No. 6, pp. 1109-1127, Jun. 2009.
Stotts, L.B, et al, "Optical Communications in Atmospheric Turbulence," SPIE 2009, vol. 7464, Aug. 21, 2009, 17 pages.
Swartwout, Michael, "The First One Hundred CubeSats: A Statistical Look," Journal of Small Satellites, vol. 2, pp. 213-233, 2013.
Tyler, Glen A. et al., "Image-position error associated with a quadrant detector", Journal of Optical Society of America, vol. 72, No. 6, Jun. 1982, pp. 804-808.
Unhelkar, V.V. et al., "Satellite Attitude Estimation using Sun Sensors, Horizon Sensors and Gyros", A dissertation approved for the degree of Master of Technology and Bachelors of Technology in Aerospace Engineering, 133 pages, Jun. 25, 2012.
Unhelkar, V.V. et al., "Spacecraft Attitude Determination with Sun Sensors, Horizon Sensors and Gyros: Comparison of Steady-State Kalman Filter and Extended Kalman Filter", Proceedings of the Itzhack Y. Bar-Itzhack Memorial Symposium on Estimation, Navigation, and Spacecraft Control, 22 pages, Oct. 2012.
Vodhanel, R. S. et al., "Performance of Directly Modulated DFB Lasers in 10-Gb/s ASK, FSK, and DPSK Lightwave Systems," J. Lightwave Technology, vol. 8, pp. 1379-1386, Sep. 1990.
Vodhanel, R.S. et al., "Ten-to-Twenty Gigabit-per-Second Modulation Performance of 1.5-mm Distributed Feedback Lasers for Frequency-Shift Keying Systems," J. Lightwave Technology, vol. 7, pp. 1454-1460, Oct. 1989.
Walther, F.G, et al, "Air-to-Ground Lasercom System Demonstration Design Overview and Results Summary," Proc. of SPIE, Aug. 24, 2010, vol. 7814, 9 pages.
www.laserlightcomms.com, downloaded Jan. 13, 2016, 2 pages.
International Search Report and Written Opinion from International Application No. PCT/US16/12641, dated May 11, 2016.
U.S. Notice of Allowance dated Jul. 5, 2017 from U.S. Appl. No. 14/817,985, 12 pages.
U.S. Final Office Action dated Sep. 19, 2017 for U.S. Appl. No. 14/991,394, 42 pages.
U.S. Non-Final Office Action dated Aug. 11, 2017 for U.S. Appl. No. 14/991,377, 34 pages.
U.S. Final Office Action dated Aug. 1, 2017 from U.S. Appl. No. 14/991,386, 28 pages.
U.S. Non-Final Office Action dated Jan. 9, 2018 from U.S. Appl. No. 15/805,094, 8 pages.
U.S. Notice of Allowance dated Jan. 26, 2018 from U.S. Appl. No. 14/991,377, 22 pages.
U.S. Notice of Allowance dated Jan. 24, 2016 from U.S. Appl. No. 14/991,386, 21 pages.
Earth Regimes Network Evolution Study, Conducted on behalf of SCaN by GSFC's Exploration and Space Communications Projects Division, May 1, 2015, 276 pages; publicly released Apr. 5, 2016.
Spellmeyer et al., "A multi-rate DPSK modem for free-space laser communications," Proceedings of SPIE, vol. 8971, 10 pages, 2014.
U.S. Non-Final Office Action dated Mar. 22, 2018 from U.S. Appl. No. 14/991,394, 53 pages.

(56) References Cited

OTHER PUBLICATIONS

U.S. Notice of Allowance (Corrected) dated Mar. 30, 2018 from U.S. Appl. No. 14/991,386, 4 pages.

* cited by examiner

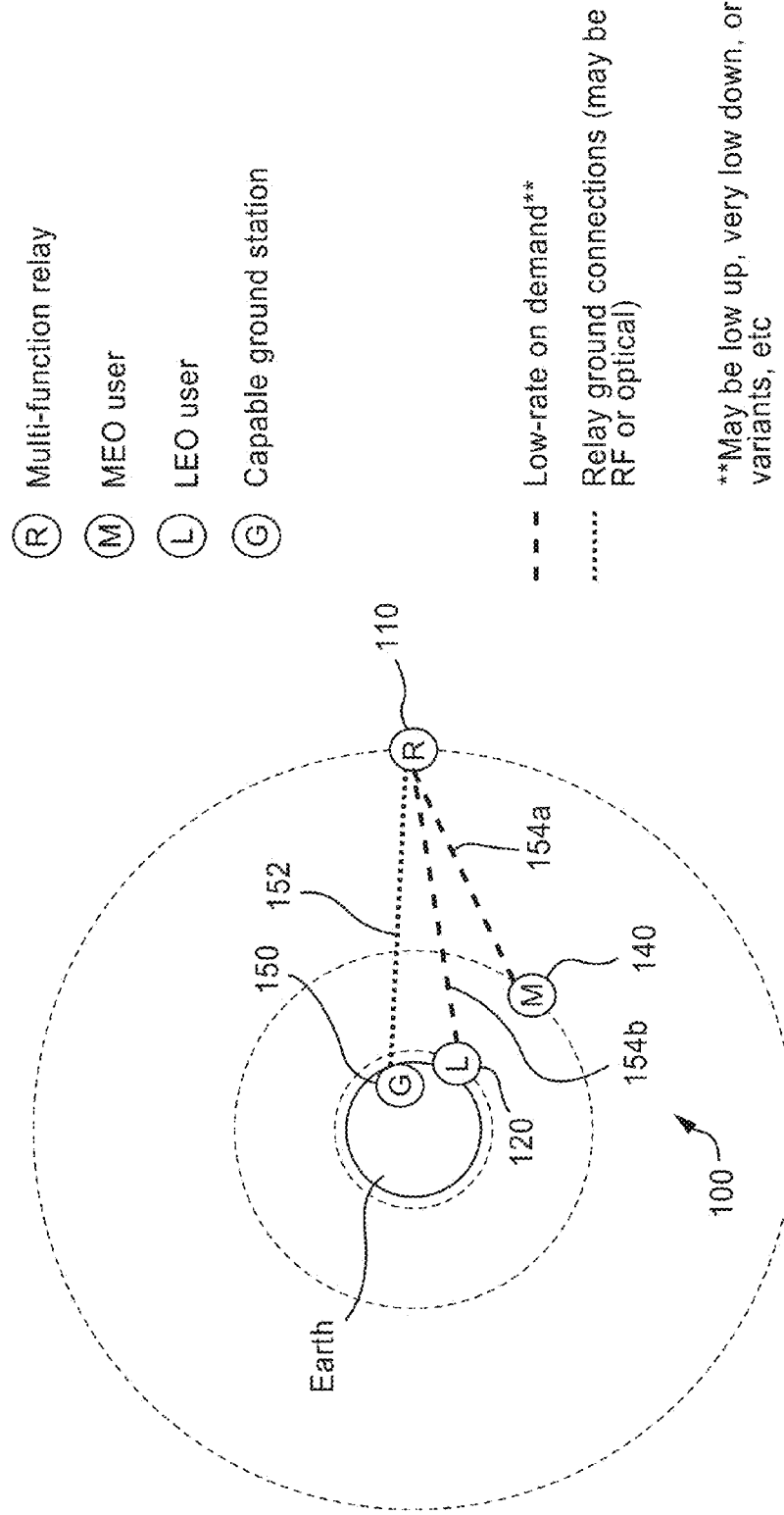

METHODS, SYSTEMS, AND APPARATUS FOR GLOBAL MULTIPLE-ACCESS OPTICAL COMMUNICATIONS

CROSS-REFERENCE TO RELATED PATENT APPLICATIONS

This application claims priority, under 35 U.S.C. § 119(e), from U.S. Provisional Application No. 62/121,668, filed Feb. 27, 2015, and titled "Methods, Systems, and Apparatus for Global Multiple-Access Optical Communications," the entire contents of which is incorporated herein by reference.

GOVERNMENT SUPPORT

This invention was made with government support under Contract No. FA8721-05-C-0002 awarded by the U.S. Air Force. The government has certain rights in the invention.

BACKGROUND

In satellite communications, multiple access is generally thought of as the capability of a communications satellite to function as a portion of a communications link between more than one pair of remote communications terminals at the same time. For example, a multiple access communications satellite may provide a first communications link between a pair of satellites in medium Earth orbit (MEO) and a second communications link between a satellite in low Earth orbit (LEO) and a terminal on Earth.

Current multiple-access communications satellite systems include the Tracking and Data Relay Satellite System (TDRSS), which is a network of American communications satellites (each called a Tracking and Data Relay Satellite (TDRS)) and ground stations used by the National Air and Space Administration (NASA) for space communications. TDRSS was established in 1973 to provide continuous communications services to NASA's most critical LEO missions. Launches of TDRS spacecraft began in the 1980s and have continued through the present day. Most of these satellites are still operational today (with a number of them operating beyond their design life).

TDRSS communicates via radio-frequency (RF) channels in space and between space and Earth. Each satellite in the most recent generation of satellites provides ground reception rates of up to 300 kbits in the S-Band, 300 Mbit/s in the Ku-band, and 800 Mbit/s in the Ka-band using a pair of single-user, 5-meter dishes. Because these dishes are single-user dishes, usage for these channels is planned beforehand. Each satellite also includes an S-band phased array with 15 transmit elements and 32 receive elements to support multiple-access RF communications at a rate of up to 300 kbps per channel. This phased array enables unplanned, simultaneous reception of several signals and transmission of one signal.

SUMMARY

Space users that create data usually want their data to be delivered to the ground. If their system is not geostationary, then they have only a few options: they can uplink or crosslink to one or more relay satellites which ultimately find or create a data path to the ground; or they can store their data in a buffer and then directly downlink it when they pass over appropriately provisioned ground sites. The technology disclosed here addresses several options for uplinking or crosslinking to relay satellite, which can then downlink to data to a terminal on the ground.

Readouts through relays have been used for radio communications systems. But even with rather large terminals at both ends of the link (to compensate for the relatively long communications distances), they cannot support data rates that are high enough for modern, high-data-volume users. Furthermore, a conventional geostationary Earth orbit (GEO)-satellite-based radio relay can serve only one or two large users or perhaps ten or twenty low-rate users at a time, even with multiple-access. To use the high-rate capability, conventional satellite-based radio relay systems use pre-allocations, thus making their utility less flexible.

The optical bands can be used to great advantage to provide higher data rates and on-demand multiple access. Optical receiver arrays can be created to receive low-to-medium data rates from hundreds of simultaneous users. This capability can be used directly to support the relaying of low-rate data to the ground. The receiver array can act as an entry for optical users who want to request, in real time, the use of a high-rate terminal, thus giving high-rate systems a demand-access feature. And optical terminals that can support very high data rates can be quite small, and thus a satellite can carry a large number of them.

Embodiments of the present technology can support users desiring continuous, low-rate data delivery and/or users requesting service from another part of the relay satellite. One embodiment includes an optical receiver for multiple-access optical communications at a satellite in geostationary Earth orbit (GEO). This optical receiver may include a first telescope, a focal plane array (FPA) disposed in a back focal plane of the first telescope, a bandpass filter in optical communication with the first telescope and/or the FPA, a controller operably coupled to the FPA, and at least one transmitter operably coupled to the controller. In operation, the first telescope, which has a first field of view of at least about 20°, receives an inbound free-space optical signal at a first wavelength from a satellite in low-Earth orbit (LEO). The FPA detect the inbound free-space optical signal, which is filtered by the bandpass filter to transmit light at the first wavelength and reject light at other wavelengths. The controller monitors a trajectory of the inbound free-space optical signal across the FPA as the satellite in LEO moves with respect to the satellite in GEO. And the transmitter transmits an outbound free-space optical signal, e.g., back to the LEO satellite or to another satellite, in response to detection of the inbound free-space optical signal.

The inbound free-space optical signal may be modulated at a data rate less than a frame rate of the FPA, which may be configured to simultaneously detect a plurality of inbound free-space optical signals from a plurality of satellites in LEO.

The transmitter may configured to modulate the outbound free-space optical signal at a rate of at least about 1 Megabit per second (Mbps), at least about 10 Mbps, or more. In some cases, the optical receiver may include an array of optical transmitters, each of which has an aperture with a diameter of about 3 cm or less to transmit a corresponding outbound free-space optical signal to a corresponding remote terminal.

The optical receiver can also include a second telescope with a second field of view smaller than the first field of view. The second telescope may receive another inbound free-space optical signal from the satellite in LEO. This other free-space optical signal may be at a second wavelength different from the first wavelength and may be modulated at a rate of at least about 1 Mbps. In this case, the bandpass filter can be configured to reject light at the second wavelength.

The optical receiver may also include a buffer, operably coupled to the controller, to store data received from the satellite in LEO prior to transmission of the data via the transmitter at rate greater than 100 kbps. In addition, the optical receiver may include an actuator, operably coupled to the transmitter, to steer a field of view of the transmitter through an angular range of ±20°.

Another example optical receiver for multiple-access optical communications at a satellite comprises a first telescope, a bandpass filter in optical communication with the first telescope, an FPA in optical communication with the first telescope, a read-out integrated circuit (ROIC) operably coupled to the FPA, and a controller operably coupled to the FPA. The first telescope has a first field of view of at least about 20° and receives a plurality of inbound free-space optical signals, each of which is at a first wavelength. The bandpass filter transmits light at the first wavelength and rejects light at other wavelengths. The FPA detects the inbound free-space optical signals. The ROIC reads out the FPA asynchronously with respect to modulation of the inbound free-space optical signals. And the controller monitors trajectories of the inbound free-space optical signals across the FPA.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a multi-function service based on an optical multiple access (OMA) service on a satellite in geostationary Earth orbit (GEO).

DETAILED DESCRIPTION

Figure 1B:
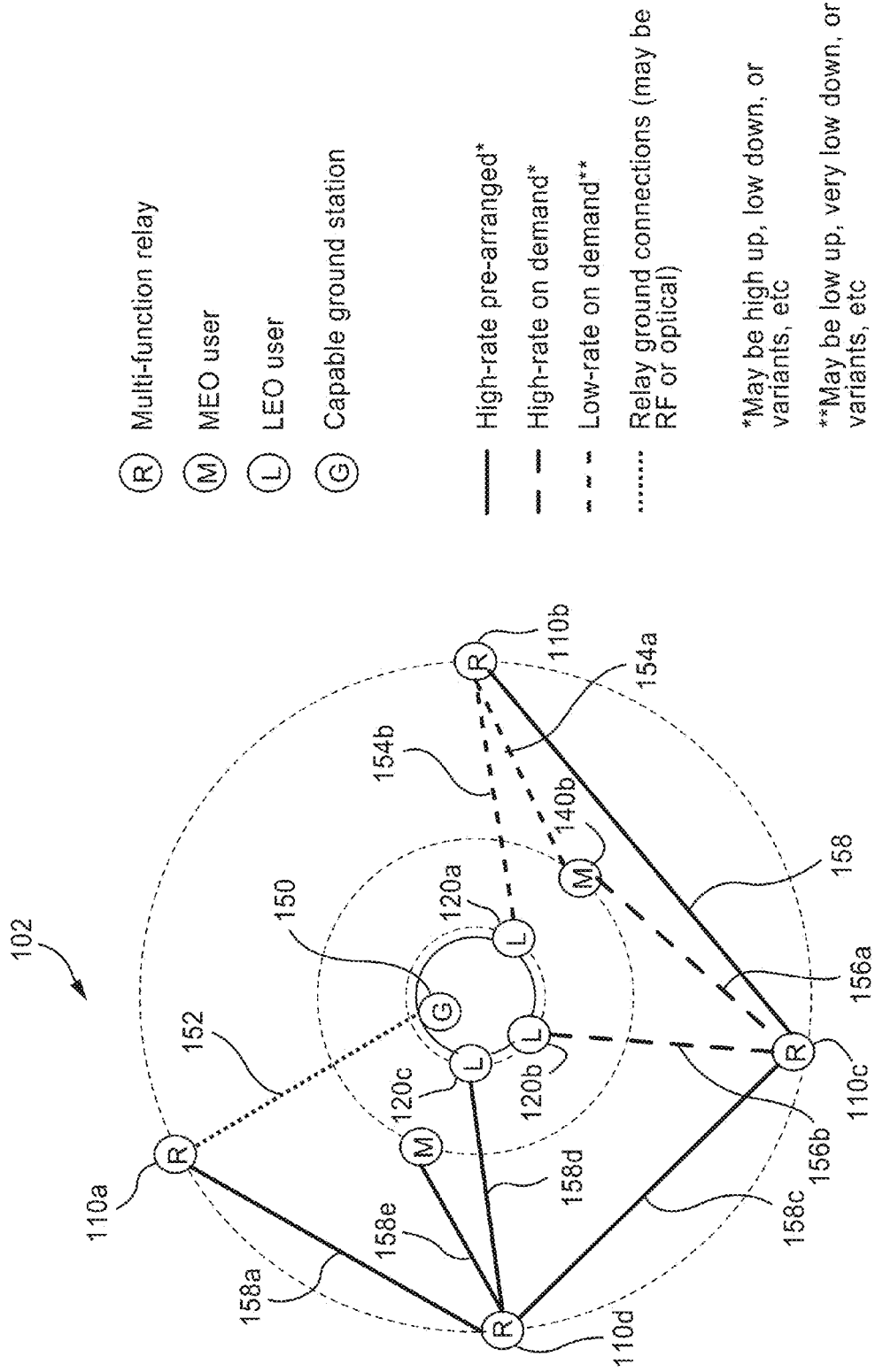
FIG. 1B shows an architecture for a space-based (e.g., near-Earth) communications network using OMA GEO satellites to relay communications between ground stations and satellites in low-Earth orbit (LEO) and medium-Earth orbit (MEO).

In the near future, NASA expects that there will be many dozens, or perhaps even hundreds to thousands, of new near-Earth spacecraft performing various missions, each of which will need a capable communication system. Some of these spacecraft may transmit data continuously at very high data rates, e.g., megabits to gigabits per second, if not higher. These spacecraft may relay data to each other and/or to terminals on Earth via an optical multiple access (OMA) system based on one or more multi-function relay satellites in high orbit, e.g., geostationary Earth orbit (GEO). This OMA system may provide on-demand data transmission on the order of today's Internet.

Here, a GEO- (or other high-orbit based-) terminal acts as a multiple access relay. Its receiver is a relatively fast-readout optical detector array, such as a focal plane array (FPA), that looks through a telescope at either the entire Earth, subregions of the Earth, or, possibly, the Earth plus spacecraft in low Earth orbit (LEO) and/or medium Earth orbit (MEO). The FPA allows for a multiple-beam-antenna (MBA) arrangement, with each pixel in the FPA monitoring a different region on Earth or in near Earth orbit.

The GEO relay terminal may include a fixed-position wide-field-of-regard telescope points toward the Earth. At its focal plane is a detector array, with each pixel naturally mapping to a separate angular region of the telescope's full field. It will act like a typical multiple-beam antenna. The focal plane array (FPA) includes efficient optical detectors and a readout that can produce an output for each pixel at the frame rate, e.g., 1-10 KHz, 10-100 kHz, 0.1-10 MHz, and so on, with all pixels sampled at the same time and in step. Different FPAs may allow more independent sampling strategies, such as polling different detector elements at different rates and/or at different polling times. The outputs from the detectors in the FPA are sent to an array processor, in which the user's pulsed signals are identified, spatially tracked, demodulated, decoded, and passed on to the system controller and network processor.

Return links may be created only for known users that have requested entry to the system, and not necessarily for each possible receiver pixel. In the near term, a multiple-transmitter system may be either an array of independently-steered small telescopes, a larger telescope that is fast-steered with data bursted amongst the many users, or a hybrid system. Because the transmit beams may be narrower than the regions monitored by the receiver pixels, each transmitter may include its own pointing/tracking system which can also aid in the system's tracking the users on the receiver. Since the transmit and receive apertures are separate, point-ahead actuation is straightforward. Real-time closed-loop corrections to point-ahead can easily be included in the user/node hand-shaking protocols if desired.

Signals for the return links can come from either a bank of modems or a single, fast, time-multiplexed modem. Wavelengths can be selected to reduce or minimize transmit/ receive interference and inter-user interference. For a multiple small transmit apertures architecture, each aperture can have its own laser transmitter.

The system can be made extremely small. For example, a 100 mW pulsed transmitter sent up through a 5 mm aperture, pointed by the LEO spacecraft, or a simple dedicated gimbal if the LEO does not have pointing capability, to within 150 µrad, can support 10 kbps to a MA receiver system that has a telescope only about 10 cm to about 20 cm in diameter, assuming a typical present-day camera/FPA. Future FPA designs may be able to support even higher rates, e.g., 100 kbps, 1 Mbps, 10 Mbps, 100 Mbps, or higher. The MA system may not need a separate pointing mechanism if its satellite can keep it approximately sub-satellite-pointed. (Note that even this can change as long as the speed of the change is within the range of the LEO-pixel-tracking algorithm.)

Such a system has several uses: it can be used to search for, identify, and accept users who want to use one of the larger relay terminals that could be carried on-board the relay satellite, thus obviating any need for pre-coordination. It can also be used for continuous readout of users who desire low data rates and for communicating with these users. For use as a gateway into the medium- or high-rate system, this OMA system could be paired with a farm of higher-rate terminals, each of which can have a telescope with an aperture diameter of about 2 cm to about 30 cm (e.g., 5 cm). The request signal could be at the lower data rates, and then, when control is handed to the other terminal, duplex higher-rate communication can be performed.

Unlike present radio frequency (RF) relay systems, which can support only one or two high-rate users, and do so with much pre-planning in order to share the precious capability, OMA systems can support on-demand access for many high-rate users via a large number of relatively small but high-rate optical heads. Because high-rate optical heads tend to have very narrow fields of view, a wide-field system is paired with the high-rate optical heads to provide demand-access capability. Thus, an OMA system can serve as a demand access gateway for the high-capability heads. It can also simultaneously act as a relay for hundreds of concurrent users at lower readout rates for continuous read-out and/or two-way communications.

For instance, an OMA system may serve on-demand user satellite requests for information including but not limited to pointing data, locations of interest for sensors, event timing, ground and other satellite system status, etc. It may provide as-needed/as-desired centralized pushing out of information. It may also service on-demand user requests for specialty services such as high-rate emptying of buffers and provide near-continuous capability for low-rate command uploads, tasking updates, and telemetry readouts. Moreover, an OMA system can be implemented with user terminals that are relatively inexpensive, software and protocols that may be similar to terrestrial protocols, flexible and capable interconnected infrastructures, and security measures to help protect the space assets.

Optical Multiple Access (OMA) System

FIG. 1A shows an OMA system 100 that provides one or more points of entry into a terrestrial communications network. The OMA system 100 includes a GEO relay satellite 110 that can communicate with one or more LEO satellites 120, ground stations 130, and MEO satellites 140 simultaneously. The GEO relay satellite 110 communicates with the LEO satellite 120 and MEO satellite 140 via respective free-space optical low-rate, on-demand links 154a and 154b (collectively, low-rate, on-demand links 154) and with the ground station 130 via an optical or RF relay ground connection link 152. The relay ground connection link 152 may be one-way or two-way, and can be at low bandwidth (e.g., 100 kbps or less), moderate bandwidth (e.g., 1-100 Mbps), or high bandwidth (e.g., 100 Mbps, 1 Gbps, or higher). Likewise, the low-rate, on-demand links can also be one-way or two-way.

For point-to-point links like those shown in FIG. 1A, shorter wavelengths (e.g., optical wavelengths) have a number of benefits over longer wavelengths (e.g., radio wavelengths). Some benefits of optical over radio bands include but are not limited to: (1) smaller telescopes and lower transmitted power because of more efficient power delivery via narrow optical beams; (2) broader, less crowded spectrum, with bandwidth available at higher frequencies; (3) no regulations on free-space optical spectrum (except for safety considerations); (4) narrow optical beams allow for very large numbers of even slightly spatially-separated users to share a single node telescope/antenna and not interfere with each other; and (5) narrow optical beams are less susceptible to interference or interception, either intentional or unintentional.

As explained in greater detail below, to operate at short (e.g., optical) wavelengths, the GEO relay satellite 110 may include a telescope with a very wide field of regard (e.g., 15°, 20°, 25°, or more) that can receive beams from many users simultaneously. It may also include one or more telescopes with wide fields of regard that can transmit independently and simultaneously to many users (e.g., the LEO satellite 120, ground station 130, and MEO satellite 140). The GEO relay satellite 110 may include a pointing system to ensure that the narrow transmitted beams are pointed stably and accurately, possibly using knowledge of the target's location and the user's own attitude. It may use a suitable initial acquisition protocol to establish links with other terminals in the OMA system. And it can maintain a continuously active duplex minimum link (e.g., an RF-to-ground link, optical-to-ground link, or optical crosslink to another GEO node) that provides on-demand access to connections and applications for pointing applications.

FIG. 1B shows an architecture 102 that uses OMA terminals in several GEO nodes 110a-110b (collectively, GEO nodes or GEO relay satellites 110) to provide communications to a population of LEO satellites 120a-120c (collectively, LEO satellites 120) and MEO satellites 140a and 140b (collectively, MEO satellites 140). The GEO nodes 110 acquire, maintain, and utilize connections with as many users as possible, without requiring too much Size, Weight, and Power (SWaP) at either end of the links.

The architecture 102 shown in FIG. 1B supports a variety of different links, including relay ground connections 152 between the GEO nodes 110 and one or more ground stations 130; low-rate, on-demand links 154 between the GEO nodes 110 and the LEO satellites 120 and MEO satellites; high-rate, on-demand links 156a and 156b between the GEO nodes 110 and the LEO satellites 120 and MEO satellites; and intra-system links 158a-158e between GEO nodes 110 and the LEO satellites 120 and MEO satellites 140 and among the GEO nodes 110 themselves. For instance, the intra-system links may include crosslinks 158a-158c between the GEO nodes and uplinks and downlinks 158d, 158e between GEO nodes 110 and the LEO satellites 120 and MEO satellites 140. These intra-system links may be at any suitable data rate and can be pre-arranged, on-demand, opportunistic, periodic, and/or continuous.

The crosslinks, uplinks, and downlinks provide points of entry into the terrestrial network (not shown) from almost anywhere in near-Earth space. In FIG. 1B, for example, LEO satellite 120*a* can connect to the ground station 130 via a low-rate, on-demand link 154*b* to GEO node 110*b*, which connects via crosslinks 158*a*-158*c* to GEO node 110*a*, which in turn connects to the ground station 130 via the relay ground connection 152. In principle, three or more GEO nodes 110 could provide coverage over the entire Earth from any point in LEO. The same coverage could be achieved with multiple nodes in MEO or specialty orbits. The nodes may also "hand off" users, similar to the handoffs in cellular telephone service, possibly by updating and/or exchanging information about locations, attitudes, time, etc.

GEO and LEO Terminals for an OMA System

Figure 2:
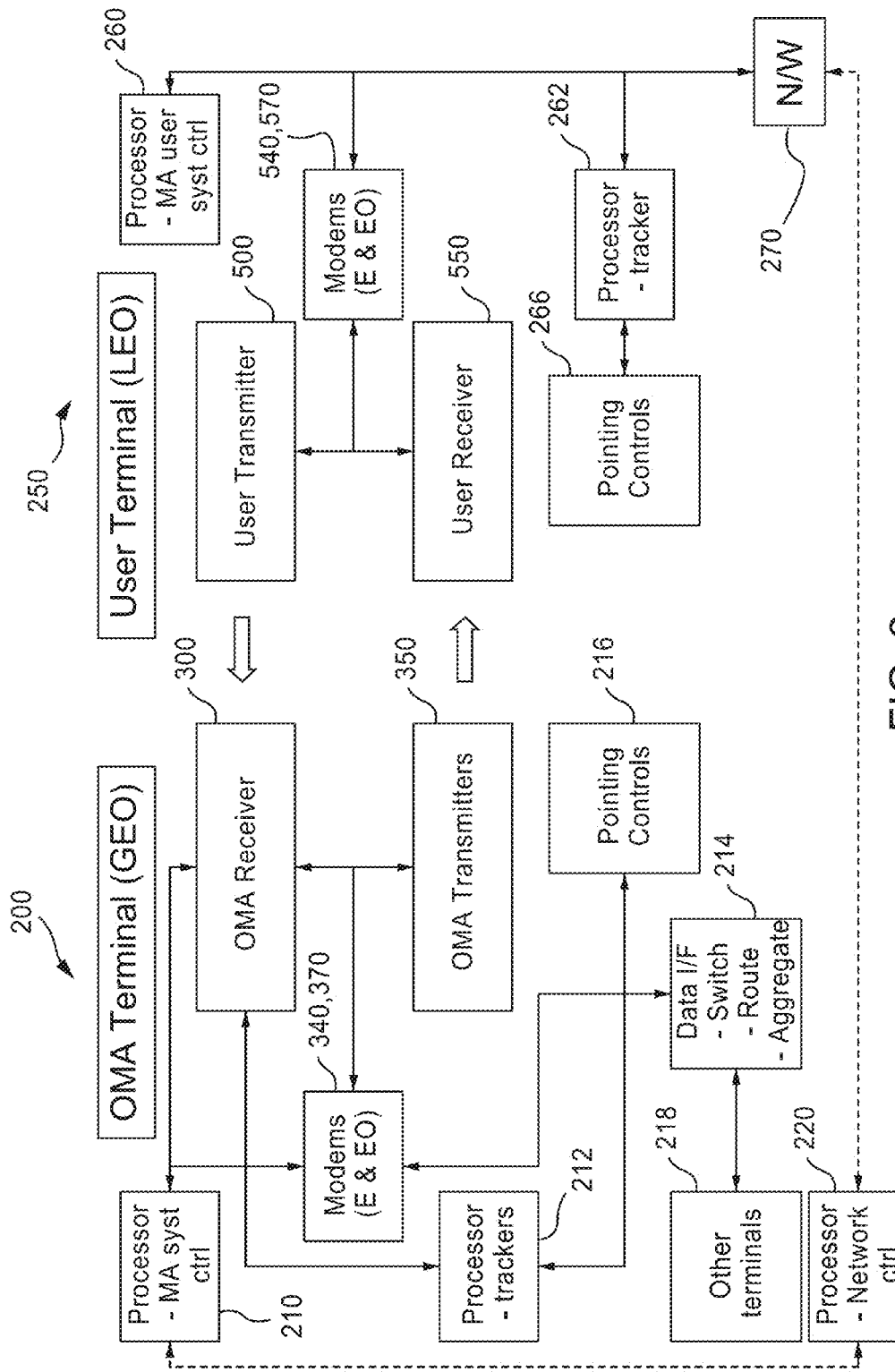
FIG. 2 shows a block diagram for an OMA terminal for a GEO satellite and a user terminal for a LEO or GEO satellite in the architecture of FIG. 1B.

FIG. 2 illustrates parts of an OMA terminal 200 for a GEO relay satellite and a user terminal 250 for a LEO satellite, MEO satellite, or ground terminal in the systems shown in FIGS. 1A and 1B. The OMA terminal includes an OMA receiver 300 that is coupled to one or more receiver modems 340, a multiple-access (MA) processor 210, and one or more tracking processors 212, which are coupled in turn to pointing controls 216. The OMA receiver 300 is also coupled to one or more OMA transmitters 350, connect to one or modems transmit modems 370. The transmit modems 370 and receive modems 340 may be connected to other terminals 218 on the same GEO relay satellite via a data switching, routing, and aggregating processor 214, which may also include a memory for buffering signals received by the GEO relay satellite. (One of skill in the art will readily appreciate that the processing can be implemented using any suitable architecture, including both the multiple-processor architecture shown in FIG. 2 and architectures with more or fewer components, including single-processor architectures.)

The user terminal 250 also includes a transmitter 500 and receiver 550, which are coupled to transmit modems 540 and receive modems 570, respectively. The modems 540, 570 receive data from and provide data to a terrestrial communications network 270, such as the Internet, and to a (MA) processor/system controller 260 and a tracking processor 262, which in turn is coupled to pointing controls 266. The terrestrial communications network 270 may communicate with a network control processor 220 in the OMA terminal 200 via the free-space optical communications link between the OMA terminal 200 and the user terminal 250.

Figure 3A:
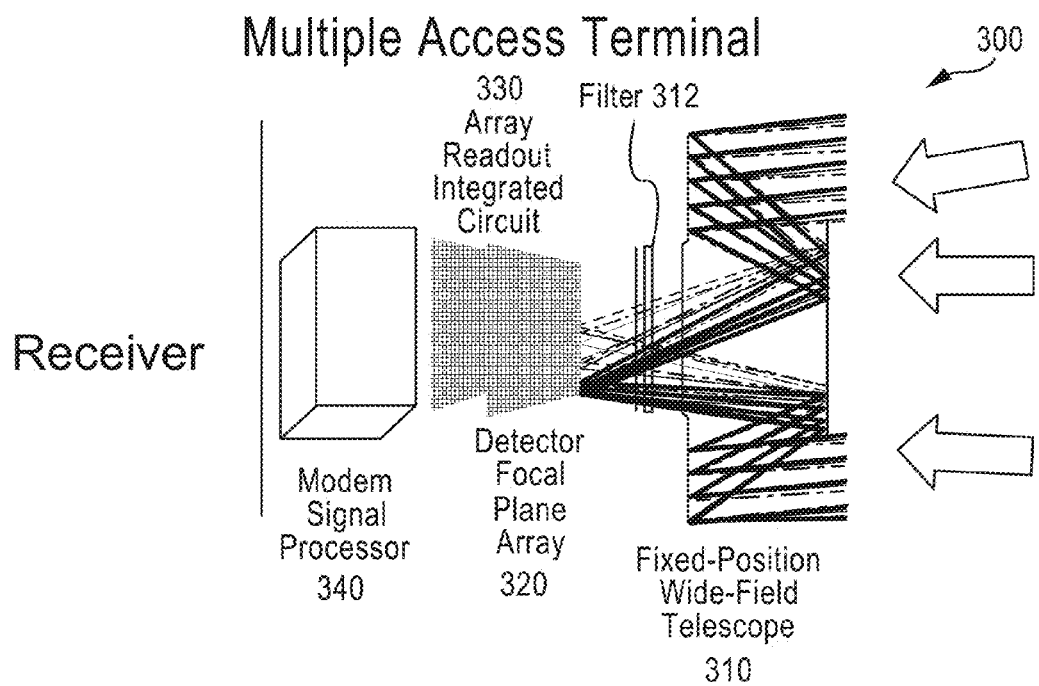
FIG. 3A illustrates a low-rate OMA transceiver for use in an OMA terminal on a GEO satellite.

FIG. 3A shows the OMA receiver 300 in greater detail. It includes a fixed-position, wide-field telescope 310 that receives free-space optical signals from satellites in LEO and MEO and possibly from ground stations as well. The telescope's field of view is chosen so that it can see all or substantially all of Earth as well as satellites in LEO and possibly MEO from orbit. At GEO, this translates to a field of view of about 20°. The telescope 310 may be fixed and have a relatively small aperture (e.g., a 10-30 cm aperture), although smaller or larger telescopes may be feasible for terminals with different capabilities. The exact aperture size may be determined in part by the links' optical power budget and desired bandwidth as well as the FPA speed and filtering capability.

A passband or notch filter 312 in optical communication with the telescope 310 transmits light received by the telescope 310 to a multi-pixel focal plane array (FPA) 320. As readily understood by those of skill in the art, the filter 312 can be implemented as a discrete component and placed between the telescope 310 and the FPA 320, within the telescope 310, or on the far side of the telescope 310 from the FPA 320. The filter 312 can also be implemented as one or more coatings on the telescope lenses or the FPA 320. In any event, the filter 312 passband is selected to transmit light over a very narrow range of wavelengths (e.g., 5 nm, 1 nm, 0.1 nm, or less) and reflect or attenuate light outside that range. The center wavelength of the passband is selected to be at or very near the wavelength (e.g., 1550 nm) of the low-rate, free-space optical signals transmitted by the user terminal 250 to the OMA receiver 300. For instance, the optical signals may be transmitted at a wavelength within the wavelength-division multiplexing (WDM) C band (1530-1570 nm); other infrared and visible wavelengths may be considered as well. Filtering away light outside the passband, including light reflected off Earth and the moon, reduces the DC bias, noise, and saturation effects in the signal generated by FPA 320.

Light transmitted through the filter 312 illuminates the FPA 320 (discussed in greater detail below), which transduces the incident optical signals into electrical signals. The FPA 320 may be implemented as a single-photon-counting detector array using any suitable technology, including but not limited to the Geiger-mode avalanche photodiode (GM-APD) and digital FPA (DFPA) technology developed at MIT Lincoln Lab. With these technologies, the FPA 320 may have a frame rate of kilohertz to Megahertz.

A read-out integrated circuit (ROIC) 330 coupled to the FPA 320 reads out the signals, which are demodulated and processed using a receiver modem (modem signal processor) 340. The ROIC 330 enables low-rate (e.g., kilohertz-class) readout of all the pixels in the FPA 320 with higher rate (e.g., 10-100 kHz class) readouts of a selected subset of pixels (e.g., pixels actively receiving data from LEO satellites, MEO satellites, and/or ground stations). Other FPA and ROIC designs may enable rates that are 10-1000 times higher for each of these readouts.

In some cases, the FPA 320 and ROIC 330 may be configured to perform on-chip filtering, processing, and transferring operations to reduce the readout bandwidth, increase the SNR, etc. For instance, the ROIC 330 may include special-purpose circuits designed to perform searching, symbol synchronization, tracking across pixels, and so on. The ROIC 330 can also perform functions like source identification and/or authentication.

If desired, the FPA 320, ROIC 330, receiver modem 340, and other electronics can be implemented in a straightforward manner in an MA receiver, although present technologies tend not to have long lives in high-radiation environments. Hardening would increase the lifetime of the FPA 320 and other electronics and reduce the likelihood of radiation-induced malfunctions.

Figure 3B:
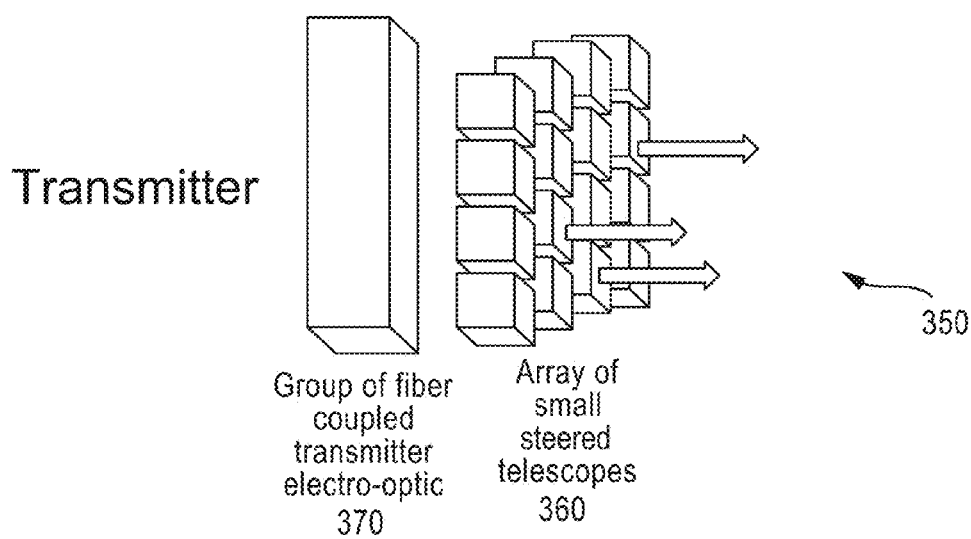
FIG. 3B illustrates an array of high-rate OMA transmitters for use in an OMA terminal on a GEO satellite.

FIG. 3B shows the OMA transmitter 350 in greater detail. In this example, the OMA transmitter 350 includes an array of transmitter modules 370 fiber-coupled to an array of smaller telescopes 360, each of which may have an aperture with a diameter of about 1-5 cm. Each transmitter module 370 includes a single transverse mode laser transmitter that generates an optical beam at wavelength outside the passband of the filter 312 in the OMA receiver 300. Each optical beam may be modulated at rate of kilobits to Megabits per second or higher (e.g., 100 kbps, 1 Mbps, 10 Mbps, etc.) and transmitted to a receiver at a LEO satellite, MEO satellite, or ground station via a corresponding telescope 360.

Each telescope 360 may be mounted on or coupled to an actuator, such as a flexured mount or 2-axis tilt actuator, that steers the telescope 360 over ±10°, which is generally adequate for steering a beam transmitted by from a GEO relay satellite to a LEO satellite. For a 1 centimeter aperture, this translates to a tilt of about ±1 mm. The actuator may be steered by an acquisition and tracking controller, which could use the uplink beam as detected by a dedicated acquisition and tracking detector in each telescope.

The transmitter 350 can be configured for one-way or two-way communication. For two-way (duplex) communication, each telescope 360 can also be coupled to one of several types of optical communications receivers that could include filtering, detection, demodulation, and decoding filtered optical signals. Depending on the telescope and beam size, the transmitter 350 may also include or be coupled to a point-ahead actuator.

Figure 3C:
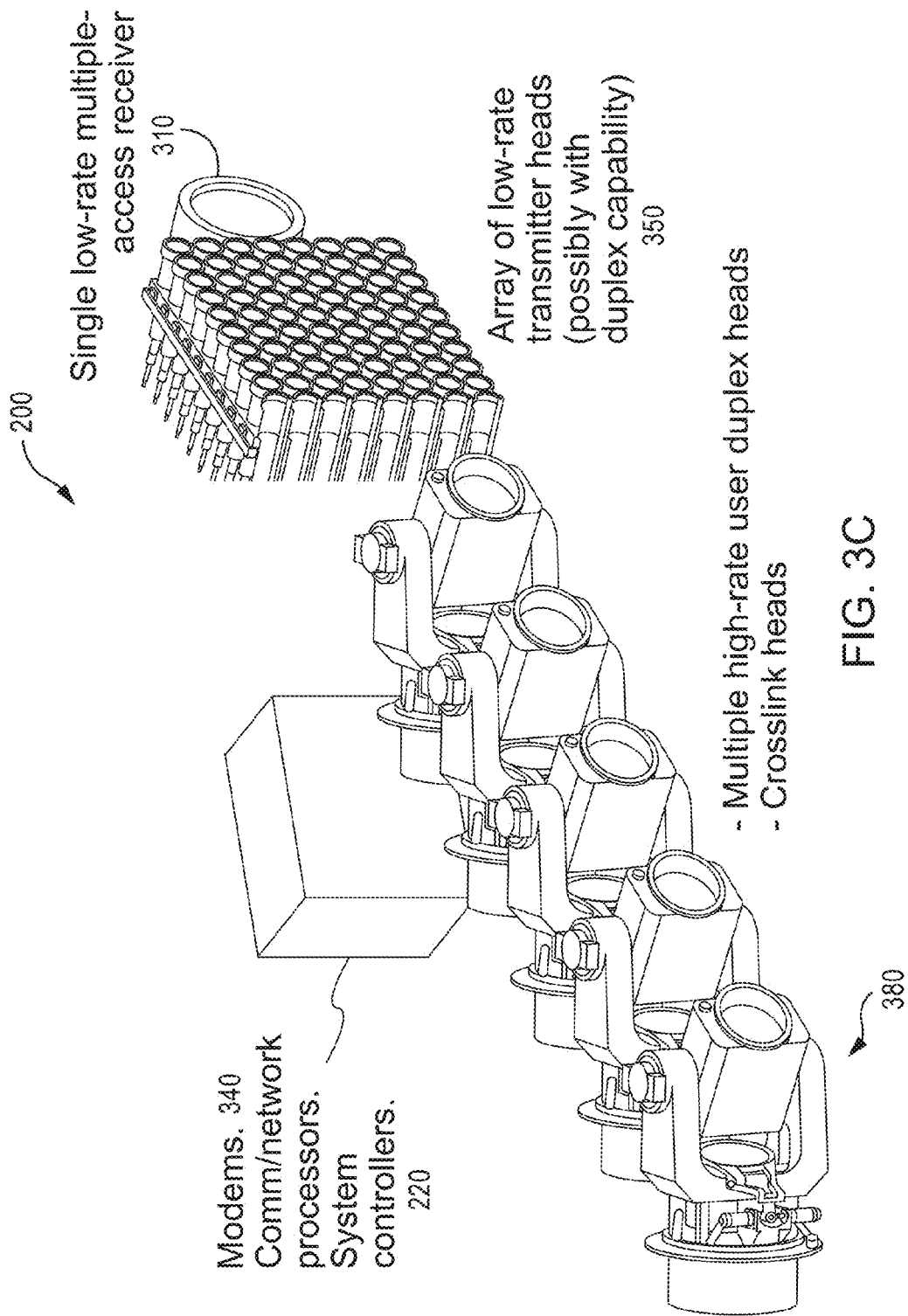
FIG. 3C is a perspective diagram of the optics for an OMA terminal, including optics for both the low-rate OMA transceiver and the array of high-rate OMA transmitters.

FIG. 3C is schematic diagram of one possible implementation of the OMA transmitter 200 with dedicated apertures of different sizes for transmitting and receiving data at different rates and power levels. The low-rate, MA receiver telescope 310 is next to a rectangular array of transmitter telescopes 360, each of which is configured for low-rate communication, possibly with duplex capability. (An array of 16×16 1 cm transmitter telescopes 360 would be only about 25 cm square.) This version of the OMA transmitter 200 also includes an array of high-rate duplex heads 380 for crosslinks, downlinks, and uplinks. The duplex heads 380 are mounted on two-axis actuators for steering over an angular range of ±10°, ±15°, ±20°, or any other suitable angular range.

The aperture sizes of these telescopes 310, 370, and 380 depends on the transmit power, data rate, and link characteristics, among other things. TABLE 1 (below) gives example aperture diameters for a variety of data rates over a 40,000 km LEO-to-GEO space link:

TABLE 1

LEO to GEO Multiple Access Space Links Approximate System Sizing

| Data Rate | LEO aperture diameter | LEO transmit power | GEO aperture diameter |
|---|---|---|---|
| 10 Mbps | 1 cm | 1 W | 10 cm |
| 1 Mbps | 1 cm | 1 W | 3 cm |
| 100 Kbps | 1 cm | 1 W | 1 cm |

Since one use of the system is to act as an access port for a user wanting to use a higher-rate capability, and users using the high-rate terminals should not interfere with MA, the MA system can be designed to operate at a slightly different wavelength from other optical systems carried by the satellite. This WDM can be implemented by setting the transmitters to operate at a different carrier wavelength from the uplink MA signals (e.g., a unique carrier wavelength for each transmitter). Each receiver may include a narrowband optical filter for rejecting other wavelengths.

A Focal Plane Array (FPA) for Detecting and Track Low-Rate Signals

Figure 4:
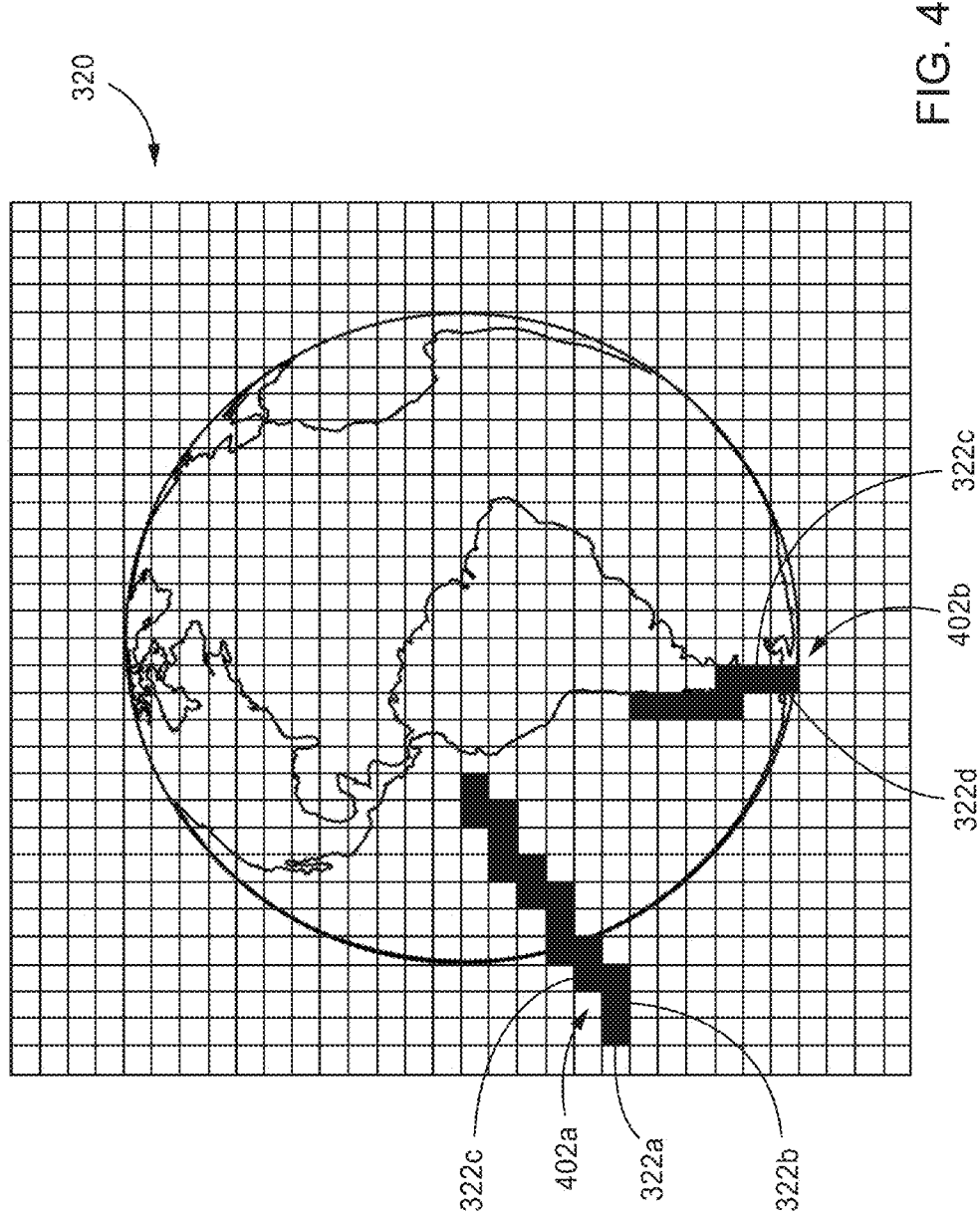
FIG. 4 illustrates the apparent transit of a LEO satellite across pixels of a focal plane array (FPA) in a low-rate OMA transceiver.

FIG. 4 shows how the FPA 320 detects and tracks signals from many LEO and MEO satellites at the same time. From orbit, the FPA 320 stares at the entire visible portion of Earth (the far side of Earth is out of view) and a portion of outer space above Earth's surface, possibly extending into MEO. Each pixel in the FPA 320 stares at a particular subregion on Earth. For example, in an FPA with 500×500 pixel array, each pixel sees an approximately 0.5-milliradian square region on Earth, corresponding to about 24 km×24 km area at the sub-satellite point. a. (FIG. 4 shows 32×32 pixels for simplicity and clarity.)

The FPA 320 also has pixels that stare at regions of the atmosphere and outerspace at Earth's periphery. As satellites in LEO or MEO orbit Earth, they appear in outerspace regions at the edge of Earth's periphery. In FIG. 4, a satellite in an orbit inclined about 30° with respect to the equatorial plane appears at the left edge of the FPA 320, and a satellite in a polar orbit appears at the bottom of the FPA 320. In this case, the satellite in the inclined orbit appears in a region monitored by pixel 322a, and the satellite in the polar orbit appears in a region monitored by pixel 322d. These pixels 322a, 322d receive low-rate free-space optical signals from the satellites and convert them into electrical signals suitable for further processing.

As these satellites orbit Earth, they trace trajectories 402a and 402b across the pixels in the FPA 320. The ROIC 330 and/or MA system controller 210 monitor and track the satellites as they transit through their orbits. As the satellites orbit, their free-space optical signals disappear from pixels 322a, 322d and appear in pixels 322b, 322e—that is, the satellites' signals appear to move from one pixel to another. The ROIC 330 and/or MA system controller 210 account for this movement by monitoring the pixel outputs and managing how the signals from the FPA 320 are processed.

In some cases, the ROIC 330 reads out every pixel in the FPA 320 in parallel at a fixed frame rate (e.g., 1 kHz, 10 kHz, 100 kHz, 1 MHz, 10 MHz, etc.), with pulsed signals detected at a rate lower than the frame rate. (Signals modulated at a rate greater than the frame rate may be effectively filtered out.) Some pixels may be read out more frequently (e.g., at MHz or even GHz rates) to support higher data rates. Signaling can be done using optical pulses and the baud rate can be capped at approximately the FPA's frame rate.

This read out may be asynchronous with respect to the signals received by the FPA 320. For instance, the FPA 320 can be read out using its own clock, so signaling can be implemented to work independently of this. Thus, a pulsed system, a bit slower than the frame rate, may allow the most robustness. Higher data rates can be obtained using multi-level (or pulse amplitude modulation (PAM)) signaling providing more than one bit per pulse but possibly involving a wider dynamic range in the readout electronics.

With asynchronous read out, multiple pixels in the FPA 320 may detect the same signal simultaneously, e.g., if a satellite transits the boundary between regions monitored by adjacent pixels during a single frame integration period. In this case, the ROIC 330 or controller 210 may sum or average the signals from the adjacent pixels to increase the signal-to-noise ratio (SNR).

The telescope 310 and FPA 320 may also be selected and/or configured such there are more pixels in the FPA 320 than the telescope 310 is designed to resolve. In other words, the telescope 310 may resolve each region on Earth and in space to a spot that covers a corresponding group of pixels in the FPA 320. Spreading the spots, which may or may not be diffraction-limited, over several pixels mitigates potential dead spots on the FPA 320.

In some implementations, each pixel (or group of pixels) in the FPA 320 services one user at a time. In these implementations, the number of pixels in the FPA 320 can be selected to handle the expected number of users (e.g., one user per pixel) or can be made with fewer pixels to provide higher pixel readout rates (e.g., for the same total array readout rate) and hence higher supported user data rates. It is also feasible to share a pixel between two or more users using either Time-Division-Multiplexing or Optical Orthogonal Codes for Code-Division Multiple Access (CDMA), although the data rate per user may be proportionately lower.

The ROIC 330 and/or other electronics can electronically process and aggregate the signals received by the FPA 320. For example, automatic power-level monitors, signal synchronization, demodulation, and decoding can be performed in a first digital processor (e.g. tracking processor 212 in FIG. 2), whose inputs can be multi-bit measurements from one or more pixels in the FPA 320. Another processor (MA system controller 210) can perform (continuous) searching for new users, detection of new user, acceptance of the user in response to the correct identification (and perhaps encryption) information from the user, handing over of a requesting user to a separate higher-rate terminal, spatial tracking (with predictions) of moving users across the FPA 320, and reception of multiple low-rate users. Decisions on whether to allocate a higher-rate terminal to the user can be done either in this processor or on the ground.

A third processor (e.g., data processor 214 in FIG. 2) can also bundle the desired data into a stream for sending on to a downlink (or perhaps crosslink) processor and transmission system. The processed, aggregate signals may be sent to an independent downlink system, such as radio-frequency or optical downlink. Return links to the users may involve a separate system, made up either of an array of transmitters, a fast-scanning time-multiplexed single transmitter, or some combination thereof, e.g., as described below.

A User Terminal for a LEO Satellite, MEO Satellite, or Ground Station

Figure 5B:
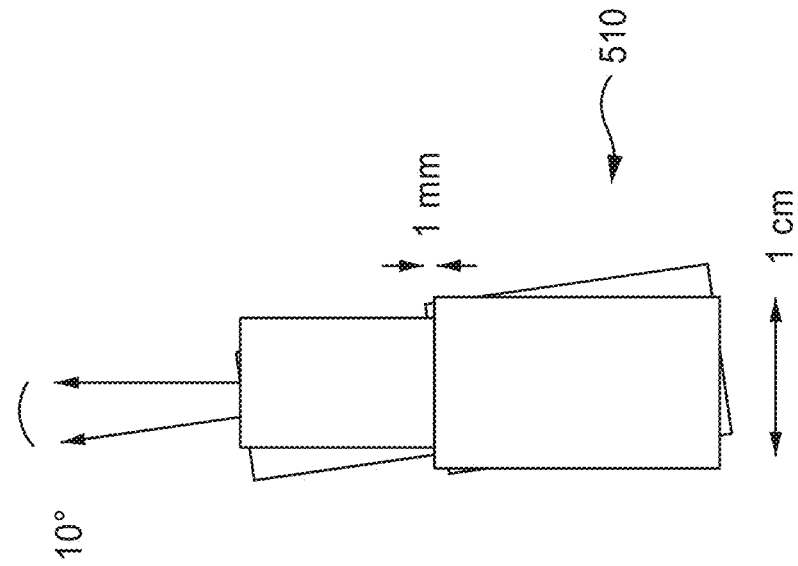
FIG. 5B shows steering of a transmitter suitable for use in a low-rate OMA transceiver.
Figure 5A:
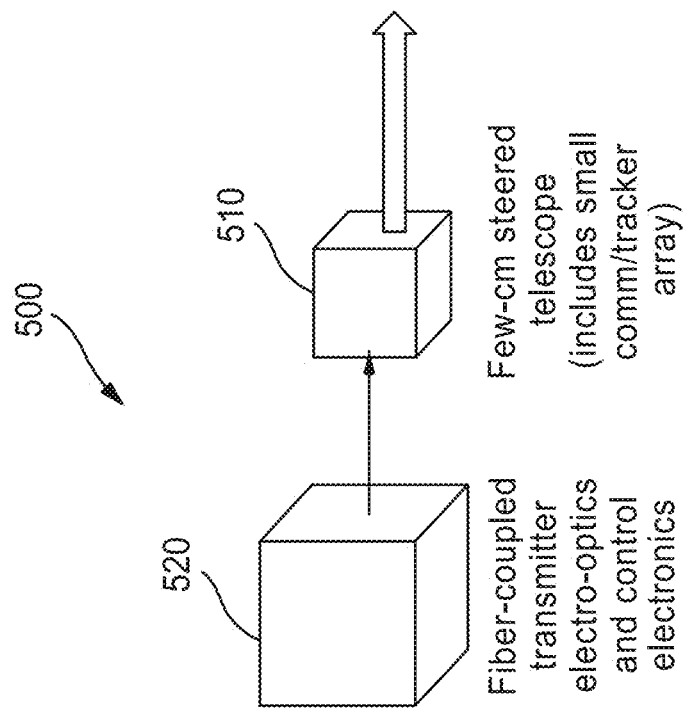
FIG. 5A is a block diagram of a transmitter suitable for use in a low-rate OMA transceiver.
Figure 5C:
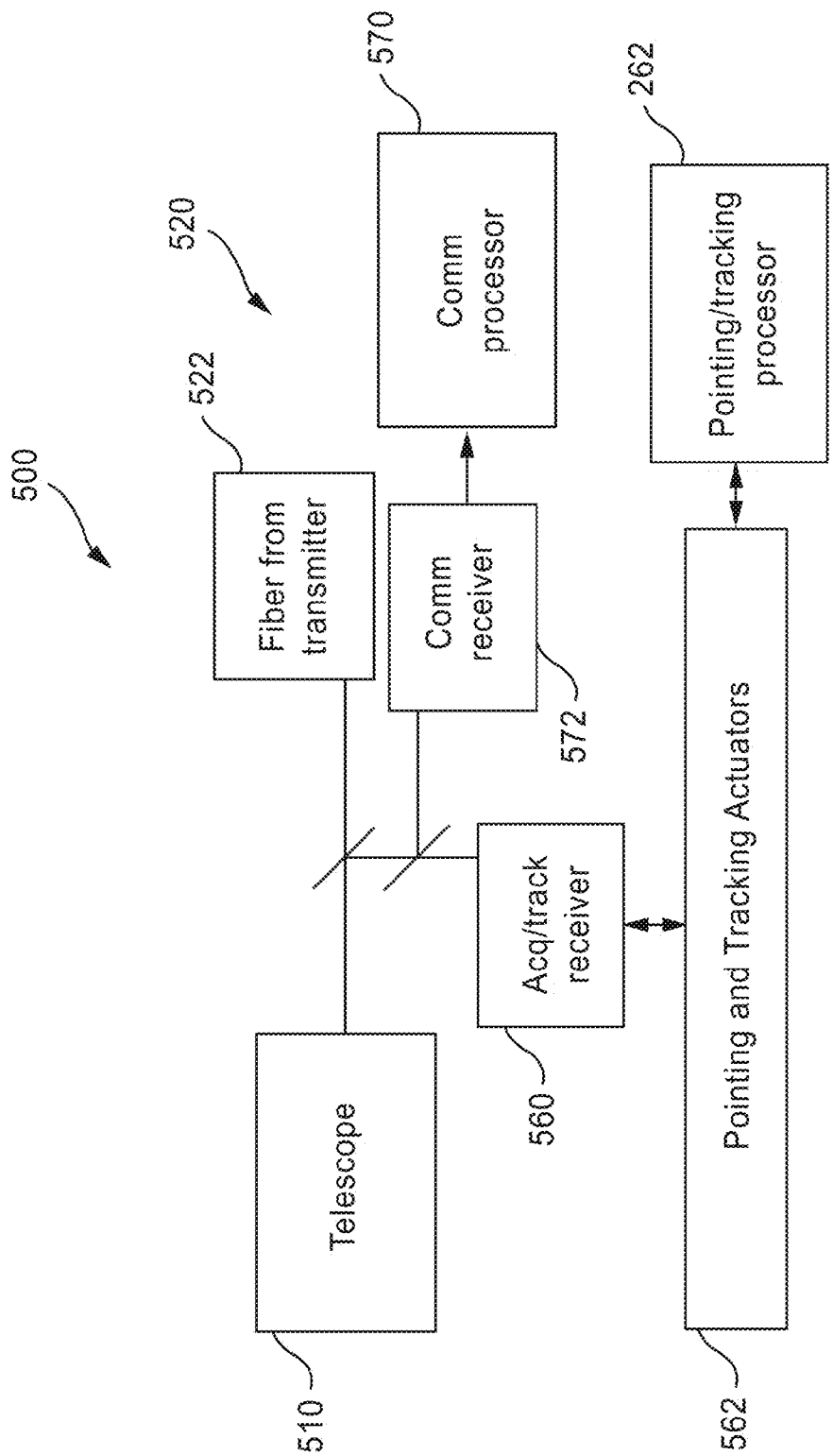
FIG. 5C is another block diagram of the transmitter of FIGS. 5B and 5C.

FIGS. 5A-5C illustrate a user terminal 500 that can be mounted on a LEO satellite, MEO satellite, or ground station for communication with a GEO relay satellite. The user terminal 500 can be relatively simple in order to keep its cost down. It may comprise a single, small aperture, fully-gimballed, telescope 510 with a fiber-fed transmitter 522, an acquisition/tracking detector 560, and a communications receiver 572, with a point-ahead actuator 562 if desired. The telescope 510 may have an aperture diameter of about 1-5 cm and can be steered through a 10° angular range using an actuator or body pointing by the satellite.

The fiber-fed transmitter module 522 may include a laser that emits light in the passband of the GEO OMA receiver filter (filter 312 in FIG. 3A) and modulator that modulates the emitted light at a rate less than the frame rate of the FPA 320. It may also have a tunable or separate laser that emits light in the band of a dedicated smaller GEO telescope or perhaps the higher-capability larger GEO telescope, with a modulator that modulates the emitted light at the medium-to-high data rate of that telescope.

Control electronics 520 in the transmitter module 520 control the transmission wavelength and the modulation rate. The control electronics 520 include a communications receiver 572 and communications processor (modem) 570 code transmissions and/or decode signals received via the GEO relay satellite or another link the communications network, including data messages used to perform higher network-level functions for operating in the network. The control electronics 520 may also provide security messaging, include authentication codes and/or handshaking signals, to make sure that only allowed users enter the system.

The user terminal 500 can also have either a fiber receiver (with a point-ahead capability) or a wide-field receiver that is less sensitive to mis-pointing for receiving incoming communications from the GEO relay satellite. It may also have a narrow-field tracker for steering and stabilizing the telescope 510. The tracker and wider-field communications receiver could be implemented as a single small array if the received data rates are within the speed capabilities of the array.

An Optical Multiple Access (OMA) Communications Process

Figure 6:
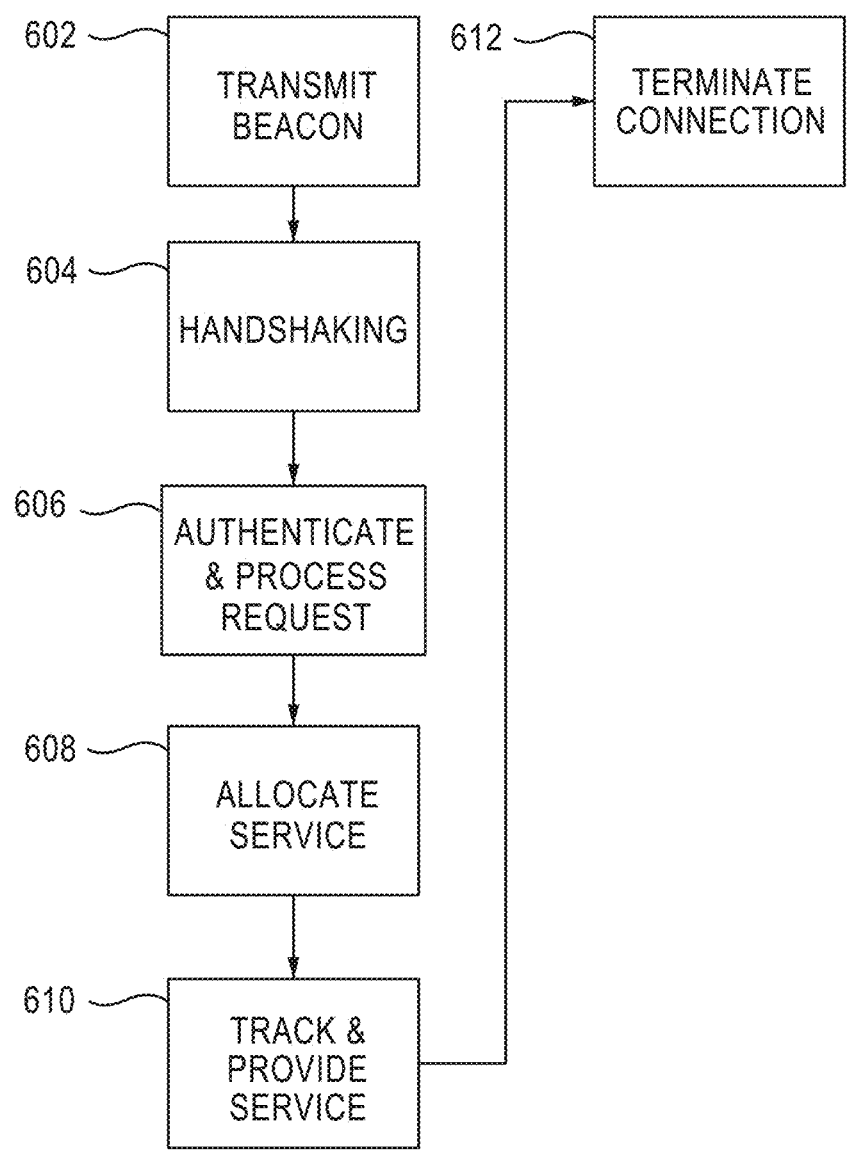
FIG. 6 is a flowchart that illustrates a process for OMA communications.

FIG. 6 illustrates a process 600 for communicating via an OMA GEO relay satellite, or node. When a LEO (or MEO) satellite comes into view of a GEO relay satellite, it transmits a beacon to the GEO relay satellite via a low-rate, free-space optical beam. In some cases, the LEO satellite uses an estimate of its own position and attitude plus knowledge of GEO relay satellite's position to scan a low-rate uplink beam across an uncertainty region likely to include the GEO relay satellite. The LEO satellite may also have a de-focus capability, which it can use to illuminate the GEO relay satellite with near certainty, but at a lower flux. It may also servo its position/pointing angle using a combination of steering and de-focusing plus feedback from the GEO relay satellite as described below. All of these protocol choices can be set in advance by the system designers.

The GEO relay satellite, which continuously monitors every pixel in its FPA, detects the beacon from the LEO satellite as a signal flash and begins handshaking with the LEO satellite (step 604). The node's coordinated small telescope sends an optical response toward the source of the signal flash. This response indicates that the node detected the signal flash and indicates to the LEO satellite which way the LEO satellite should point. The beam transmitted by the GEO relay satellite may be narrower than the angle of the receiver pixel, so it, too, may scan or perhaps defocus. When the LEO satellite receives the response, it corrects its pointing and then transmits, at the lowest, most robust and common data rate, its identification, possible security details, and a service request. The node, knowing that there is a user on that pixel, expects such a signal, and acquires and demodulates the information. During this exchange, each terminal spatially acquires and tracks the incoming signal upon which its own transmitter pointing is based. The entire exchange may proceed according to a protocol designed with a balance of robustness and speed and may take no more than a few tens of seconds, depending on the position and attitude uncertainty of the LEO satellite.

The node's controller then decides whether to accept the user and grant the service and sends a response to the user (step 606). The subsequent service may include: low-rate handshaking and background network control information until one terminal or another initiates an active session; a continuous, medium-rate network session with selected data rates on up and downlinks, e.g., for two-way housekeeping as well as continuous readout of telemetry or sensor data; or a request for the node to provide a higher-capability terminal to support high-rate services, and to oversee the handover.

The node allocates service to the LEO satellite based on the request and the available resources (step 606). The LEO terminal's service request and/or other user terminal operations (e.g., rate changes) can be coordinated via in-band signaling from the GEO relay satellite, for example. This could be initiated autonomously by the GEO relay satellite, based on available resources and priorities. Or it could be coordinated by ground operators or systems.

In response to the service allocation, the GEO relay satellite provides the allocated service to the LEO satellite, possibly while providing service to other satellites and ground stations. If the LEO satellite requests a higher-rate link, for example, the GEO relay satellite may instruct the LEO satellite to transmit higher-rate data to an adjacent higher-rate receiver on a different WDM channel. The LEO satellite either switches to a separate fiber-fed transmitter or performs a re-tuning of its single transmitter. If the uplink service remains on the FPA, then the node also monitors the LEO satellite as it traverses pixels in the FPA and makes pixel handover look seamless to the LEO satellite. And if it gets handed off to a duplex small telescope or a duplex large telescope, the LEO satellite no longer needs to illuminate the OMA/FPA.

Depending on the number of users and the desired services, the node may use its FPA as an uplink receiver for all users at low to medium data rates and provide a dedicated low-rate transmitter for each user. In this scenario, the node could provide duplex service until the LEO satellite stops transmitting, moves out of the node's field of view, or is handed off to the next node. When using the GEO node's FPA as an uplink receiver for users at low to medium data rates, the LEO node may also transmit periodically or in a time-division-multiplexed fashion, with inertial stabilization between the downlinks it uses to correct its pointing. The node may also use its FPA as an "entrance" into the communications network, with further duplex service provided via 1-2 cm telescope for downlinks and a separate fiber receiver for uplinks and/or with a separate high-rate terminal.

Since the node is in continuous contact with the users, it can push data or commands at any time to the LEO satellite, include commands from other users in the network. Depending on the network infrastructure, there are many options for further connections. For instance, the relay node can include a high-rate RF or optical link with a ground station that includes data from one or more of the connected users. The GEO relay satellite can communicate with a ground station directly or via a high-rate, Direct-to-Earth transmission provided by another LEO satellite. The relay node may have high-rate crosslinks to other nodes, which would allow for many more options of connectivity and downlinks.

When a user is about to go out of sight of a node or stops transmitting, the node terminates service (step 612). Termination can be accomplished using any of a number of options. For instance, the LEO satellite may just drop off and start acquisition from scratch with the next node. This could likely be done very quickly if the nodes and users have learned positions and attitudes well during handshaking and telemetry data exchange in recent sessions. Alternatively, the GEO relay satellite may anticipate termination and instruct the next node coming into view point its downlink at the LEO satellite. The LEO satellite can either drop the first link (perhaps after being told that the new node is ready) and quickly slew to receive the downlink. The LEO satellite may also include a second tracking receiver, aperture, or terminal that can make a new link with the next node before breaking the tracked link with the current node.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical receiver for multiple-access optical communications at a satellite in geostationary Earth orbit (GEO), the optical receiver comprising:
 a first telescope having a first field of view of at least about 20° to receive an inbound free-space optical signal at a first wavelength from a satellite in low-Earth orbit (LEO);
 a focal plane array (FPA), disposed in a back focal plane of the first telescope, to detect the inbound free-space optical signal;

a bandpass filter, in optical communication with the first telescope and/or the FPA, to transmit light at the first wavelength and reject light at other wavelengths;

a controller, operably coupled to the FPA, to monitor a trajectory of the inbound free-space optical signal across the FPA as the satellite in LEO moves with respect to the satellite in GEO; and at least one transmitter, operably coupled to the controller, to transmit an outbound free-space optical signal in response to detection of the inbound free-space optical signal.

2. The optical receiver of claim 1, wherein the inbound free-space optical signal is modulated at a data rate less than a frame rate of the FPA.

3. The optical receiver of claim 1, wherein the FPA is configured to simultaneously detect a plurality of inbound free-space optical signals from a plurality of satellites in LEO.

4. The optical receiver of claim 1, wherein the at least one transmitter is configured to modulate the outbound free-space optical signal at a rate of at least about 1 Megabit per second (Mbps).

5. The optical receiver of claim 4, wherein the at least one transmitter is configured to modulate the outbound free-space optical signal at a rate of at least about 10 Mbps.

6. The optical receiver of claim 1, wherein the at least one transmitter comprises:

an array of optical transmitters, each optical transmitter of the array of optical transmitters having a corresponding aperture with a diameter of about 3 cm or less to transmit a corresponding outbound free-space optical signal to a corresponding remote terminal.

7. The optical receiver of claim 1, further comprising:
a second telescope, having a second field of view smaller than the first field of view, to receive another inbound free-space optical signal from the satellite in LEO, the other free-space optical signal being at a second wavelength different from the first wavelength and being modulated at a rate of at least about 1 Mbps.

8. The optical receiver of claim 7, wherein the bandpass filter is configured to reject light at the second wavelength.

9. The optical receiver of claim 1, further comprising:
a buffer, operably coupled to the controller, to store data received from the satellite in LEO prior to transmission of the data via the at least one transmitter at rate greater than 100 kbps.

10. The optical receiver of claim 1, further comprising:
an actuator, operably coupled to the at least one transmitter, to steer a field of view of the at least one transmitter through an angular range of ±20°.

11. A method of multiple-access optical communications at a satellite in geostationary Earth orbit (GEO), the satellite in GEO comprising a first telescope in optical communication with a focal plane array (FPA), the method comprising:

receiving, via the first telescope from a satellite in low-Earth orbit (LEO), at least one inbound free-space optical signal;

detecting the at least one inbound free-space optical signal at the FPA;

monitoring a trajectory of the at least one inbound free-space optical signal across the FPA as the satellite in LEO moves with respect to the satellite in GEO; and transmitting an outbound free-space optical signal from the satellite in GEO in response to detection of the at least one inbound free-space optical signal.

12. The method of claim 11, wherein receiving the at least one inbound free-space optical signal comprises transmitting the at least one inbound free-space optical signal through a bandpass filter.

13. The method of claim 11, wherein receiving the at least one inbound free-space optical signal comprises receiving a plurality of first free-space optical signals from a plurality of satellites in LEO.

14. The method of claim 11, wherein detecting the at least one inbound free-space optical signal at the FPA comprises reading out the FPA at rate of greater than a modulation rate of the at least one inbound free-space optical signal.

15. The method of claim 11, wherein transmitting the outbound free-space optical signal comprises transmitting the outbound free-space optical signal to the satellite in LEO.

16. The method of claim 11, wherein transmitting the outbound free-space optical signal comprises transmitting the outbound free-space optical signal to a receiver on Earth.

17. The method of claim 11, wherein transmitting the outbound free-space optical signal comprises modulating the outbound free-space optical signal at a rate of at least about 1 Megabit per second (Mbps).

18. The method of claim 11, wherein transmitting the outbound free-space optical signal comprises:
modulating the outbound free-space optical signal at a rate of at least about 10 Mbps; and
emitting the outbound free-space optical signal via an aperture having a diameter of at least about 10 cm.

19. The method of claim 11, further comprising:
receiving, via a second telescope having a second field of view smaller than the first field of view, another inbound free-space optical signal from the satellite in LEO, the other inbound free-space optical signal being modulated at a rate of at least about 1 Mbps.

20. The method of claim 19, wherein:
the inbound free-space optical signal is at a first wavelength and the other inbound free-space optical signal is at a second wavelength, and
receiving the at least one inbound free-space optical signal comprises transmitting light at the first wavelength to the FPA and rejecting light at the second wavelength with a filter.

21. The method of claim 11, wherein transmitting the outbound free-space optical signal comprises steering the outbound free-space optical signal through an angular range of ±10°.

22. The method of claim 11, further comprising:
imaging, with the first telescope, the entire visible portion of the Earth and at least a portion of outer space above a surface of the Earth.

23. The method of claim 11, wherein detecting the at least one inbound free-space optical signal at the FPA comprises:
detecting a first inbound free-space optical signal at a first pixel in the FPA and a second pixel in the FPA during a first frame integration period; and
at least one of summing or averaging an output of the first pixel with an output of the second pixel.

24. An optical receiver for multiple-access optical communications at a satellite, the optical receiver comprising:
a telescope having a first field of view of at least about 20° to receive a plurality of inbound free-space optical signals, each inbound free-space optical signal in the plurality of inbound free-space optical signals being at a first wavelength;

a bandpass filter, in optical communication with the telescope, to transmit light at the first wavelength and reject light at other wavelengths;

a focal plane array (FPA), in optical communication with the telescope, to detect the plurality of inbound free-space optical signals;

a read-out integrated circuit, operably coupled to the FPA, to read out the FPA asynchronously with respect to modulation of the plurality of inbound free-space optical signals; and a controller, operably coupled to the FPA, to monitor trajectories of the plurality of inbound free-space optical signals across the FPA.

25. The optical receiver of claim 24, wherein the FPA has more pixels than the telescope is configured to resolve.

26. The optical receiver of claim 24, wherein the FPA comprises at least one detector element configured to detect multiplexed inbound free-space optical signals.

* * * * *